(12) United States Patent
Kuwabara et al.

(10) Patent No.: US 8,375,079 B2
(45) Date of Patent: Feb. 12, 2013

(54) COORDINATED OPERATION METHOD, AND COMMUNICATION TERMINAL DEVICE

(75) Inventors: Masahiko Kuwabara, Tokyo (JP); Kazuo Aoki, Tokyo (JP); Toshiro Matsumura, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 465 days.

(21) Appl. No.: 11/785,079

(22) Filed: Apr. 13, 2007

(65) Prior Publication Data

US 2007/0255817 A1 Nov. 1, 2007

Related U.S. Application Data

(63) Continuation of application No. PCT/JP2005/019004, filed on Oct. 17, 2005.

(30) Foreign Application Priority Data

Oct. 15, 2004 (JP) .................................. 2004-300872

(51) Int. Cl.
*G06F 15/16* (2006.01)
(52) U.S. Cl. ............ 709/201; 705/59; 713/193; 380/231
(58) Field of Classification Search .................. 709/201; 713/193; 380/231
See application file for complete search history.

(56) References Cited

U.S. PATENT DOCUMENTS

| | | | | |
|---|---|---|---|---|
| 5,680,534 | A * | 10/1997 | Yamato et al. ................. | 345/473 |
| 5,715,403 | A | 2/1998 | Stefik | |
| 6,233,684 | B1 | 5/2001 | Stefik et al. | |
| 7,024,393 | B1 * | 4/2006 | Peinado et al. ................. | 705/59 |
| 7,080,043 | B2 * | 7/2006 | Chase et al. ..................... | 705/59 |
| 7,184,003 | B2 * | 2/2007 | Cupps et al. ..................... | 345/30 |
| 7,765,158 | B2 * | 7/2010 | Sugimoto et al. ............... | 705/51 |
| 2002/0012432 | A1 * | 1/2002 | England et al. ............... | 380/231 |
| 2002/0019814 | A1 * | 2/2002 | Ganesan ......................... | 705/59 |
| 2002/0103003 | A1 | 8/2002 | Mauro, II ....................... | 455/552 |
| 2002/0154605 | A1 * | 10/2002 | Preston et al. ................. | 370/254 |

(Continued)

FOREIGN PATENT DOCUMENTS

EP 0 715 244 A1 6/1996
EP 0 862 318 A2 9/1998

(Continued)

OTHER PUBLICATIONS

Japan Office Action dated Aug. 25, 2010.

(Continued)

*Primary Examiner* — Krista Zele
*Assistant Examiner* — James Forman
(74) *Attorney, Agent, or Firm* — Kratz, Quintos & Hanson, LLP

(57) ABSTRACT

An application load unit of a host unit loads an application main body of an engine application which has been acquired to an engine unit. Subsequently, when an execution command for the application main body is issued by the user, an execution decision means within an application execution control unit of the host unit refers to application management information, and decides whether or not it is possible to execute the application main body. If the result of this decision is affirmative, an execution command transmission means within the application execution control unit sends an execution command for the application main body to the engine unit. As a result, processing related to the engine application is apportioned between the host unit and the engine unit in an appropriate manner.

20 Claims, 14 Drawing Sheets

U.S. PATENT DOCUMENTS

| | | | |
|---|---|---|---|
| 2003/0013477 A1* | 1/2003 | McAlinden | 455/550 |
| 2003/0153304 A1 | 8/2003 | Kim | 455/412 |
| 2003/0187801 A1* | 10/2003 | Chase et al. | 705/59 |
| 2003/0217011 A1* | 11/2003 | Peinado et al. | 705/59 |
| 2004/0006749 A1 | 1/2004 | Fux et al. | |
| 2004/0076404 A1* | 4/2004 | Nakano et al. | 386/94 |
| 2004/0119723 A1 | 6/2004 | Inoue et al. | |
| 2004/0168077 A1* | 8/2004 | Waxman et al. | 713/200 |
| 2004/0181490 A1* | 9/2004 | Gordon et al. | 705/59 |
| 2004/0187014 A1* | 9/2004 | Molaro | 713/200 |
| 2004/0267953 A1* | 12/2004 | Dunbar et al. | 709/231 |
| 2005/0010531 A1* | 1/2005 | Kushalnagar et al. | 705/59 |
| 2005/0091107 A1* | 4/2005 | Blum | 705/14 |
| 2005/0259106 A1* | 11/2005 | Rai et al. | 345/564 |
| 2006/0075437 A1* | 4/2006 | Bambic et al. | 725/80 |
| 2009/0315670 A1* | 12/2009 | Naressi et al. | 340/5.8 |

FOREIGN PATENT DOCUMENTS

| | | |
|---|---|---|
| JP | 07-234784 | 9/1995 |
| JP | 8-263440 | 10/1996 |
| JP | 2000-122977 | 4/2000 |
| JP | 2002-189590 | 7/2002 |
| JP | 2003-223329 | 8/2003 |
| JP | 2003-533815 | 11/2003 |
| JP | 2004-199301 | 7/2004 |
| JP | 2005-531813 | 10/2005 |
| WO | WO 01/88679 A2 | 11/2001 |
| WO | WO 2004/006166 A2 | 1/2004 |
| WO | WO 2004/040923 A1 | 5/2004 |

OTHER PUBLICATIONS

Supplementary European Search Report dated Sep. 5, 2011.

* cited by examiner

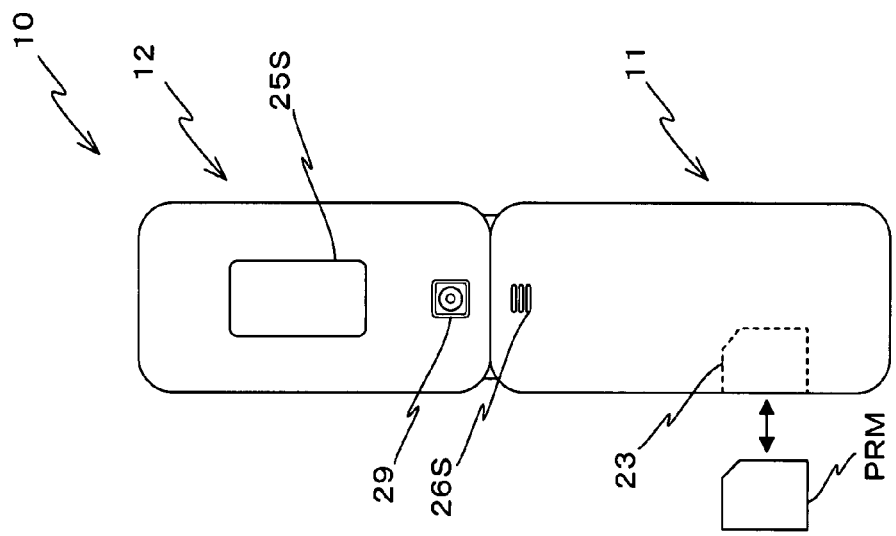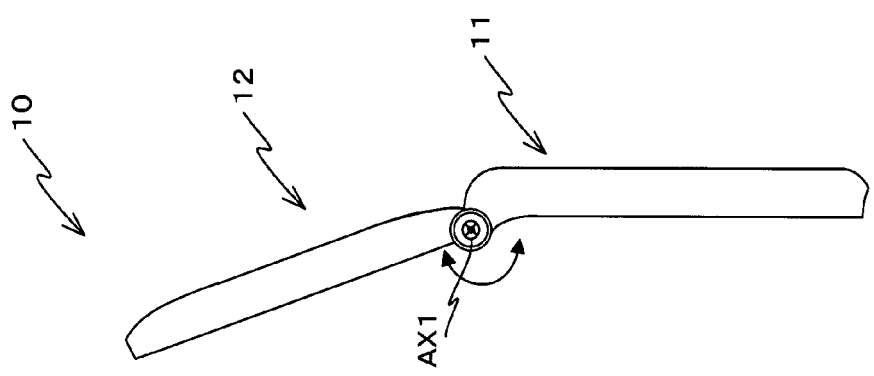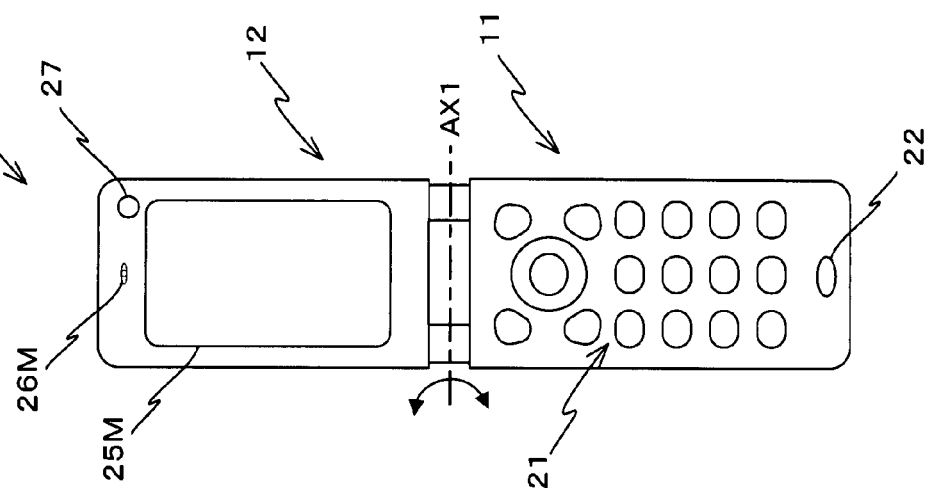

Fig. 3
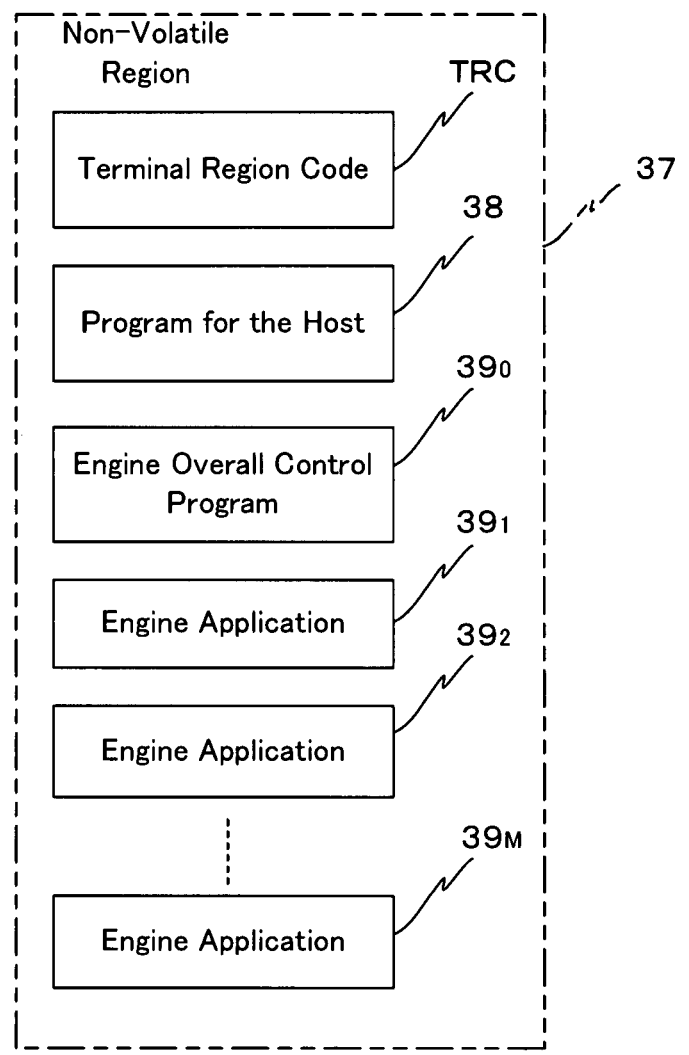
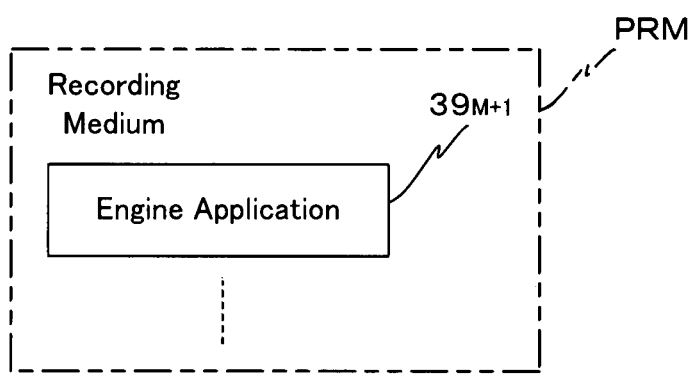

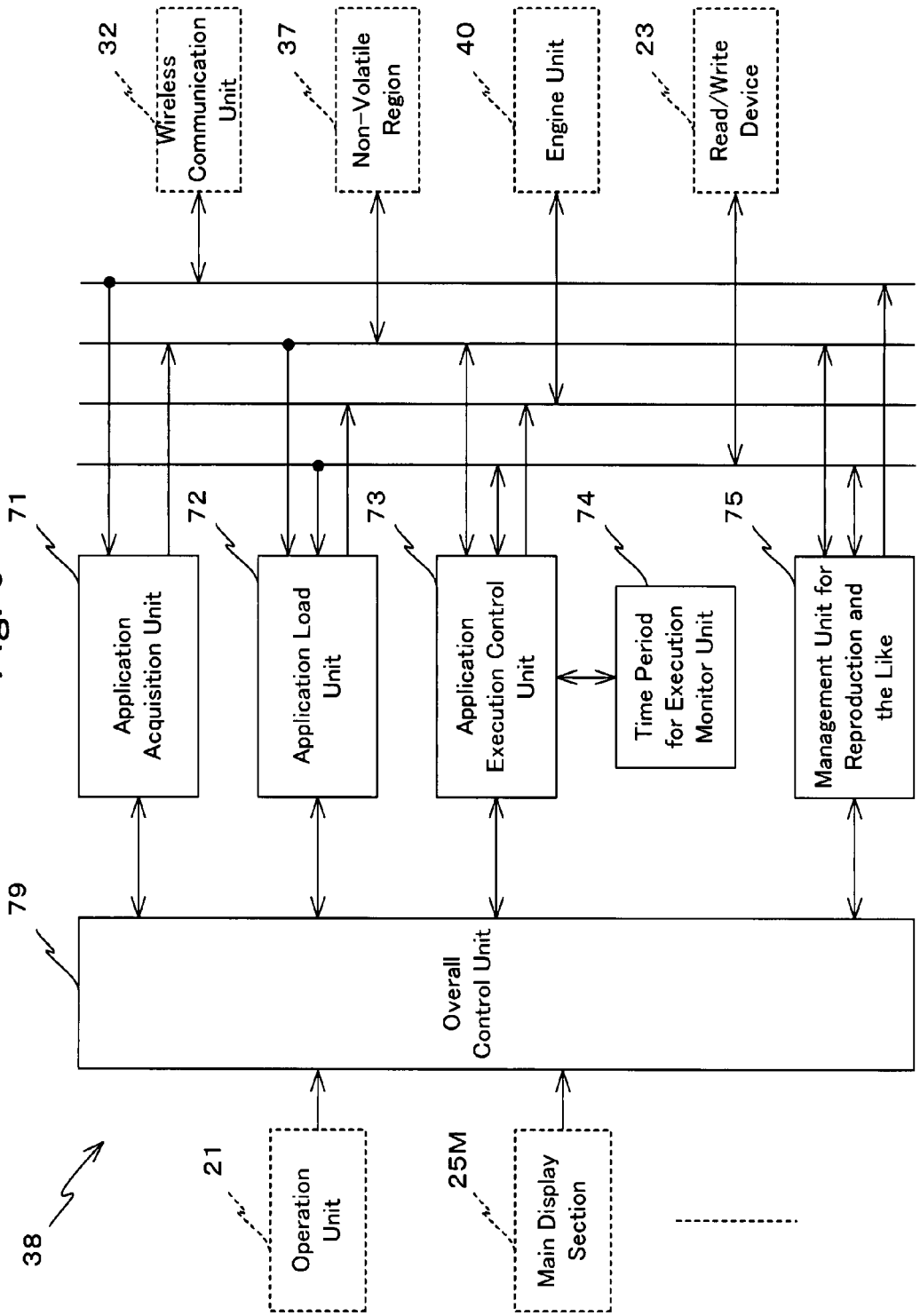

COORDINATED OPERATION METHOD, AND COMMUNICATION TERMINAL DEVICE

RELATED APPLICATION

This is a continuation application of the international patent application No. PCT/JP2005/019004 filed with Application date: Oct. 17, 2005. The present application is based on, and claims priority from, J.P. Application 2004-300872, filed on Oct. 15, 2004, the disclosure of which is hereby incorporated by reference herein its entirety.

BACKGROUND OF THE INVENTION

The present invention relates to a coordinated operation method and to a communication terminal device; and, in more detail, relates to a coordinated operation method by which a host unit which performs processing associated with communication with the exterior, and an engine unit which executes predetermined functions under the management of this host unit, operate in a communication terminal device in a coordinated manner, and to a communication terminal device which utilizes this coordinated operation method.

BACKGROUND ART

From the prior art, mobile communication terminal such as cellular phone and the like have become generally widespread as communication terminal devices. The progress of technology related to such mobile communication terminal, and in particular related to cellular phones, is very lively, and, in addition to the function of communication via a mobile communication network which is their essential function as mobile communication terminal, additional functions have been implemented in order for the user to enjoy games and the appreciation of music.

With this type of mobile communication terminal, a processor which performs various kinds of data processing is housed internally, in order to fulfill the essential function and additional functions described above. Various resources are connected to this processor, such as storage units including storage elements for storing various types of program and data, a wireless communication unit for performing wireless communication, an actuation unit for the user to issue actuation commands, a notification unit (a display section or an audio output unit) for notifying various types of information to the user, and so on. Among these, as storage units, there may be a so called internal storage unit which comprises a read only storage element (a ROM) or a random access storage element (a RAM), or a so called external storage unit which comprises a recording medium such as a memory card or the like which is accessed via a read/write device mounted to the mobile communication terminal.

As such a mobile communication terminal, in addition to a type in which an internal storage unit is pre-installed, there is also a type with which it is possible to enjoy games or music appreciation by acquiring various kinds of contents via a communication circuit or a recording medium.

SUMMARY OF THE INVENTION

Since, as described above, it is necessary for a prior art mobile communication terminal to fulfill various kinds of function, accordingly a general purpose type processor is employed as the internally housed processor. This is an excellent method from the point of view of providing a device of a simple structure, and for making the device more compact and reducing its consumption of electrical power. However, with the employment of a general purpose type processor, even though in order, for example, to enjoy games or music appreciation, an effort may be made to enhance the performance for additional functionality operation, it is nevertheless difficult to anticipate dramatic performance enhancement.

Now, when a comparison with other information processing devices is drawn, an operation in which a performance enhancement for a mobile communication terminal is obtained, may be termed an operation of additional functionality. Such an additional functionality operation in which performance enhancement is to obtained in this manner, in concrete terms, comprises game execution or music replay or the like; and, during this type of additional functionality operation, in particular the screen display processing and the audio data output processing impose a large burden upon the processor.

Furthermore, although a mobile communication terminal is required to fulfill both the above described essential function and also additional functions, since in principle the user is a single person, accordingly there is no requirement, under any circumstances, for the essential functionality operation and the additional functionality operations to operate independently at the same time. For example while the operation of telephone conversation, which is the essential functionality operation, is being performed, there is never any requirement to execute a game or the like, which is an additional functionality operation.

Due to the reasons above it has been considered, based upon management by a host unit including a host processor, which is the processor which performs communication operation, and by adding an engine processor which is dedicated to the additional functionality and which is excellent for screen display processing and audio data output processing, to execute an application corresponding to the additional functionality operation by an engine unit which includes this engine processor. In order to build the device as a whole in a compact manner, while employing this type of structure including a host unit and an engine unit, it is considered to be essential for both of them to operate in a coordinated manner.

However when, as described above, a structure is employed which includes both a host unit and also an engine unit, it is the present situation that no concrete technique has been proposed for operating the two of them in a coordinated manner. For example, although acquisition of an application such as a game or the like via a communication circuit or a recording medium or the like is a task which is performed by the host unit, no proposition at all has ever been made as to whether management processing corresponding to application management information, including copyright management information incidental to that application, should be performed by the host unit, or should be performed by the engine unit, or the like.

Thus if, for example, an application is supplied as a sample (a so called "trial version"), then the application management information is limitation information related to execution (perusal or the like), such as a cumulative number of times for execution or a cumulative time period for execution. Furthermore, from the point of view that there are circumstances in which the protection of copyright or the personal rights of the author and the like, or the copyright management entity, may be different for different countries, there is an evolving tendency for region information related to the attributes of regions in which an application which has been supplied may execute, or limitation information upon reproduction, transmission, modification, and so on of the application, or the like, to be included in the application management information.

The present invention has been conceived in consideration of the circumstances described above, and takes as an objective, for a structure including a host unit including a host processor, which performs processing related to communication with the exterior, and an engine unit, including an engine processor, which executes a predetermined function under the management of the host unit, to provide a coordinated operation method, in which processing related to an application is performed by the host unit and the engine unit in a coordinated manner.

Furthermore, the present invention takes as an objective to provide a communication terminal device which, while including a host unit which performs processing related to communication with the exterior, and an engine unit which executes a predetermined function under the management of the host unit, also performs processing related to an application with the host unit and the engine unit in a coordinated manner.

When the present invention is considered from a first aspect thereof, it comprises a coordinated operation method by which a host unit which performs processing related to communication with the exterior, and an engine unit which executes an application under the management of said host unit, perform operation in a communication terminal device in a coordinated manner, including: an application acquisition process in which said host unit acquires an application which includes a main body portion of said application, and application management information related to a utilization limit, including an execution limit for said application, which is a work; an application load process in which said host unit loads said main body portion of said application into said engine unit; an application execution decision process in which, in response to an execution command for said application from a user, said host unit refers to said application management information, and decides whether or not said application can be executed; an application execution command transmission process in which, if the result of the decision in said application execution decision process is affirmative, said host unit sends an execution command for said application to said engine unit; and an application execution process in which, upon receipt of said application execution command, said engine unit executes said application.

With this coordinated operation method, in the application acquisition process, the host unit acquires an application, including the application main body portion and the application management information. Next, in the application loading process, the host unit loads the main body portion of the application into the engine unit. This loading is performed in response to a load command for this application from the user.

In this manner, after the main body portion of the application has been loaded into the engine unit, when an execution command for said application has been issued by the user, in the application execution decision process, the host unit refers to the application management information, and decides whether or not it is possible to execute said application. If the result of this decision has been affirmative, in the application execution command transmission process, the host unit sends an execution command for said application to the engine unit. Upon receipt of this execution command, in the application execution process, the engine unit executes the application. command, in the application execution process, the engine unit executes the application.

In other words, with the coordinated operation method of the present invention, upon receipt of the application execution command from the host unit, the engine unit, which specializes in the application execution function, gives its undivided attention to execution of said application by utilizing the main body portion of the application. On the other hand the host unit, which can fulfill multiple functions as a communication terminal device, performs, among the processing related to said application, the application execution management processing other than the execution processing for the application. Accordingly, with the coordinated operation method of the present invention, the host unit and the engine unit are able to perform processing related to the application in an appropriate manner while maintaining mutual linkage, and while apportioning the processing related to the application in a logical manner.

In the coordinated operation method of the present invention, in said application acquisition process, said host unit may be arranged to acquire said application by utilizing a communication circuit. In this case, the host unit is able to acquire a desired application from various kinds of server device which are connected to the communication network which it is capable of accessing, by using the communication circuit.

Furthermore, in the coordinated operation method of the present invention, in said application acquisition process, it may be arranged for said host unit to acquire said application by utilizing a transportable recording medium. Here, a transportable storage medium such as a memory card or a memory stick or the like is included in the concept of a transportable recording medium. In this case, the host unit is able to acquire a desired application by reading out the application from a transportable recording medium upon which the desired application is recorded.

Furthermore, in the coordinated operation method of the present invention, a decision may be made in said application execution decision process, after acquisition of said application, if information of a number of times execution limit is included in said application management information, as to whether or not the cumulative number of times of execution of said application does not conflict with said number of times for execution limit. In this case, when the execution is commanded from the user of an application for which the number of times for execution limit in the application management information would be exceeded, a negative decision is made in the application execution decision process, and the application is not executed. Due to this, it is possible to enable the execution of the application, only within the range of the number of times execution limit of that application.

Furthermore, in the coordinated operation method of the present invention, along with a decision being made in said application execution decision process, after acquisition of said application, if information of a time period for execution limit is included in said application management information, as to whether or not the cumulative time period of execution of said application does not conflict with said time period for execution limit, there may be further comprised, in parallel with said application execution process: a cumulative time period of execution monitoring process of said host unit totaling the cumulative time period for execution of said application, and monitoring the excess of said time period for execution limit over the totaled result; an application forcible stoppage command process of said host unit sending a stop command to said engine unit if, during said cumulative time period of execution monitoring process, it has been detected that said totaled result has exceeded said time period for execution limit; and an application forcible stoppage process of said engine unit stopping the execution of said application upon receipt of said application stop command.

In this case, if the execution of an application is commanded from the user in the state in which the cumulative time period for execution of said application exceeds the time period for execution limit of the application in the application management information, then a negative decision result is reached in the application execution decision process, and the application is not executed.

Furthermore, if at the execution start time point the cumulative time period for execution of said application up until the present moment does not exceed the time period for execution limit of the application, then the execution of said application is started. When the execution of the application is started in this manner, in the cumulative time period of execution monitoring process, the host unit totals the cumulative time period of execution of said application, and monitors the excess of the time period for execution limit over the totaled result. And if, in this cumulative time period of execution monitoring process, it is detected that the totaled result has exceeded the time period for execution limit, then, in the application forcible stoppage command process, the host unit sends a stop command for this application to the engine unit. Upon receipt of this application stop command, in the application forcible stoppage process, the engine unit stops the execution of the application.

Accordingly, it is possible to enable the execution of an application, only within the range of the time period for execution limit of that application.

Furthermore, in the coordinated operation method of the present invention, if an application region code for limiting the region in which execution permission for said application management information is given is included in said application management information, then, in said application execution decision process, it may be arranged to make a decision as to whether or not a terminal region code which is imparted to said communication terminal device matches said application region code. In this case, if the terminal region code does not match the application region code, then a negative decision result is arrived at in the application execution decision process, and said application is not executed. Due to this, it is possible to arrange for said application to be executed, only if it has a terminal region code which matches the application region code. It should be understood that, as this application region code, there may be employed the code of the country of manufacture of the mobile communication terminal, the contracted country code in which a contract for circuit usage is concluded for said mobile communication terminal, the current zone region code of the region in which said mobile communication terminal is currently located, or the like.

Furthermore, in the coordinated operation method of the present invention, it is possible for there to be further included: an application reproduction decision process of said host unit, in response to a reproduction command for said application from the user, referring to said application management information, and deciding whether or not said application can be reproduced; and an application reproduction process of said host unit reproducing said application, if the result of this decision in said application reproduction decision process is affirmative.

In this case, when a reproduction command for the application is issued by the user, in the application reproduction decision process, the host unit refers to the application management information, and makes a decision as to whether or not reproduction of said application is possible. If the result of this decision is affirmative, then, in the application reproduction process, the host unit reproduces the application. Due to this, it is possible to perform management of the reproduction of a work, while remaining true to the intentions of the copyright holder as described in the application management information. As a result, it is possible to prevent reproduction of the application that is not permitted by the copyright holder, and it is possible to prevent infringement of his right of reproduction.

Furthermore, in the coordinated operation method of the present invention, it is possible to arrange for there to be further included: an application transmission decision process of said host unit, in response to a transmission command for said application from the user, referring to said application management information, and deciding whether or not said application can be transmitted; and an application transmission process of said host unit transmitting said application, if the result of this decision in said application transmission decision process is affirmative.

In this case, when a transmission command for the application is issued by the user, in the application transmission decision process, the host unit refers to the application management information, and makes a decision as to whether or not transmission of said application is possible. If the result of this decision is affirmative, then, in the application transmission process, the host unit transmits the application. Due to this, it is possible to perform management of the dissemination of a work due to transmission thereof, while remaining true to the intentions of the copyright holder as described in the application management information. As a result, it is possible to prevent dissemination of the application due to transmission thereof that is not permitted by the copyright holder, and it is possible to prevent infringement of his right of public transmission.

Furthermore, in the coordinated operation method of the present invention, it is possible to arrange for there to be further included: an application modification decision process of said host unit, in response to a modification command for the main body of said application from the user, referring to said application management information, and deciding whether or not the main body of said application can be modified; and an application modification process of said host unit modifying the main body of said application, if the result of this decision in said application modification decision process is affirmative. Here, in such modification of the application, there is included change of the color tone upon the screen display during execution of the application, and the like.

In this case, when a modification command for the application is issued by the user, in the application modification decision process, the host unit refers to the application management information, and makes a decision as to whether or not modification of said application is possible. If the result of this decision is affirmative, then, in the application modification process, the host unit modifies the application. Due to this, it is possible to perform management of the modification of a work, while remaining true to the intentions of the copyright holder as described in the application management information. As a result, it is possible to prevent modification of the application that is not permitted by the copyright holder, and it is possible to prevent infringement of the rights to maintain integrity of the author.

Furthermore, in the coordinated operation method of the present invention, it is possible to arrange for said application load process to include: an application loading decision process of said host unit, in response to a load command for said application from the user, referring to said application management information, and deciding whether or not said application is to be loaded; and an application load execution process of the host unit loading the main body portion of said application to said engine unit, if the result of this decision in said application loading decision process is affirmative.

In this case, when a load command for the application is issued by the user, in the application loading decision process, the host unit refers to the application management information, and makes a decision as to whether or not said application should be loaded. As a basis for this decision, for example, a reference to whether or not it is possible to execute the above described application may be employed, and it may be arranged to decide that the application should not be loaded, if it is not possible to execute the application. And, if the result of this decision in the application loading decision process is affirmative, then, in the application load execution process, the host unit loads the main body portion of the application to the engine unit. Due to this, it is possible to omit an application load operation to the engine unit which would be ineffective.

When the present invention is considered from a second aspect thereof, it comprises a communication terminal device, characterized by comprising: a host unit, comprising a host processor, which performs processing related to communication with the exterior, and an engine unit, comprising an engine processor, which executes an application under the management of said host unit; and wherein said host unit comprises: an application acquisition means which acquires an application which includes a main body portion of said application, and application management information related to a utilization limit, including an execution limit for said application, which is a work; an application load means which loads said main body portion of said application into said engine unit; an application execution decision means which, according to an execution command for said application from a user, refers to said application management information, and decides whether or not said application can be executed; and an application execution command transmission means which, if the result of the decision by said application execution decision means is affirmative, sends an execution command for said application to said engine unit.

With this communication terminal device, the application acquisition means acquires an application, including the application main body portion and the application management information. Next, the application loading means loads the main body portion of the application into the engine unit. In this manner, after the main body portion of the application has been loaded into the engine unit, when an execution command for said application has been issued by the user, the application execution decision means refers to the application management information, and decides whether or not it is possible to execute said application. If the result of this decision has been affirmative, the application execution command transmission means sends an execution command for said application to the engine unit. Upon receipt of this execution command, the application execution means executes the application.

In other words, with the communication terminal device of the present invention, it is possible to perform processing related to the application by employing the coordinated operation method of the present invention as described above. Thus, according to the communication terminal device of the present invention, the host unit and the engine unit are able to perform processing related to the application in an appropriate manner while maintaining mutual linkage, and while apportioning the processing related to the application in a logical manner.

With the communication terminal device of the present invention, a structure may be employed in which there is further provided a recorded contents read device which is connected to said host processor, and which reads out said application from a recording medium upon which said application is recorded. In this case, along with the host unit being able to acquire a desired application by utilizing a communication circuit, by installing a transportable recording medium upon which the desired application is recorded in the recorded contents read device, the host unit is able to acquire the desired application by reading out the desired application therefrom.

Furthermore, with the communication terminal device of the present invention, it is also possible for said application execution decision means, after acquisition of said application, if information of a number of times execution limit is included in said application management information, to decide whether or not the cumulative number of times of execution of said application does not conflict with said number of times for execution limit. In this case, when the execution is commanded from the user of an application for which the number of times for execution limit in the application management information would be exceeded, the result of the decision by the number of times for execution decision means of the application execution decision means becomes a negative one, and the application is not executed. Due to this, it is possible to enable the execution of the application, only within the range of the number of times for execution limit of that application.

Furthermore, with the communication terminal device of the present invention, it is also possible to utilize a structure in which, along with said application execution decision means deciding, after acquisition of said application, if information of a time period for execution limit is included in said application management information, as to whether or not the cumulative time period of execution of said application does not conflict with said time period for execution limit, said host unit further includes: a cumulative time period of execution monitoring means which, during the execution of said application, while totaling the cumulative time period of execution of said application, also monitors the excess of said time period for execution limit over the totaled result; and an application forcible stoppage command means which sends a stop command for the execution of said application to said engine unit, if it has been detected by said cumulative time period of execution monitoring means that said totaled result has exceeded said time period for execution limit.

In this case, if the execution of an application is commanded from the user in the state in which the cumulative time period for execution of said application exceeds the time period for execution limit of the application in the application management information, then a negative decision result is reached by the cumulative time period for execution decision means of the application execution decision means, and the application is not executed.

Furthermore, if at the execution start time point the cumulative time period for execution of said application up until the present moment does not exceed the time period for execution limit of the application, then the execution of said application is started. When the execution of the application is started in this manner, the cumulative time period of execution monitoring means of the host unit totals the cumulative time period of execution of said application, and monitors the excess of the time period for execution limit over the totaled result. And if it is detected, by this cumulative time period of execution monitoring means, that the totaled result has exceeded the time period for execution limit, then the application forcible stoppage command means of the host unit sends a stop command for this application to the engine unit. As a result, the engine unit stops the execution of the application.

Accordingly, it is possible to enable the execution of an application, only within the range of the time period for execution limit of that application.

Furthermore, with the communication terminal device of the present invention, if an application region code for limiting the region in which execution permission is given is included in said application management information, then it may be arranged for said application execution decision means to make a decision as to whether or not a terminal region code which is imparted to said communication terminal device matches said application region code. In this case, if the terminal region code does not match the application region code, then a negative decision result is arrived at by the region code decision means of the application execution decision means, and said application is not executed. Due to this, it is possible to arrange for said application to be executed, only if it has a terminal region code which matches the application region code.

Furthermore, with the communication terminal device of the present invention, it is possible to employ a structure in which said host unit further comprises an application reproduction means which, in response to a reproduction command for said application from the user, refers to said application management information and makes a decision as to whether or not said application can be reproduced, and which reproduces said application, if the result of this decision is affirmative. In this case, when a reproduction command for the application is issued by the user, the application reproduction decision means of the host unit refers to the application management information, and makes a decision as to whether or not reproduction of said application is possible. If the result of this decision is affirmative, then the application reproduction means of the host unit reproduces the application. Due to this, it is possible to perform management of the reproduction of a work, while remaining true to the intentions of the copyright holder as described in the application management information. As a result, it is possible to prevent reproduction of the application that is not permitted by the copyright holder, and it is possible to prevent infringement of his right of reproduction.

Furthermore, with the communication terminal device of the present invention, it is possible to arrange for said host unit further to include an application transmission means which, in response to a transmission command for said application from the user, refers to said application management information and makes a decision as to whether or not said application can be transmitted, and which transmits said application, if the result of this decision is affirmative. In this case, when a transmission command for the application is issued by the user, the application transmission decision means of the host unit refers to the application management information, and makes a decision as to whether or not transmission of said application is possible. If the result of this decision is affirmative, then the application transmission means of the host unit transmits the application. Due to this, it is possible to perform management of the dissemination of a work due to transmission thereof, while remaining true to the intentions of the copyright holder as described in the application management information. As a result, it is possible to prevent dissemination of the application due to transmission thereof that is not permitted by the copyright holder, and it is possible to prevent infringement of his right of public transmission.

Furthermore, with the communication terminal device of the present invention, it is possible to arrange for said host unit further to include an application modification means which, in response to a modification command for the main body of said application from the user, refers to said application management information and makes a decision as to whether or not the main body of said application can be modified, and which modifies the main body of said application, if the result of this issued by the user, the application modification decision means of the host unit refers to the application management information, and makes a decision as to whether or not modification of said application is possible. If the result of this decision is affirmative, then the application modification means of the host unit reproduces the application. Due to this, it is possible to perform management of the modification of a work, while remaining true to the intentions of the copyright holder as described in the application management information. As a result, it is possible to prevent modification of the application that is not permitted by the copyright holder, and it is possible to prevent infringement of the right to maintain integrity of the author.

Furthermore, with the communication terminal device of the present invention, it is possible to employ a structure in which said application load means comprises: an application loading decision means which, in response to a load command for said application from the user, refers to said application management information, and decides whether or not said application is to be loaded; and an application load execution means which loads the main body portion of said application to said engine unit, if the result of this decision by said application loading decision means is affirmative. In this case, when a load command for the application is issued by the user, the application loading decision means of the host unit refers to the application management information, and makes a decision as to whether or not the application should be loaded. If the result of this decision is affirmative, then the application load execution means of the host unit loads the main body portion of the application to the engine unit. Due to this, it is possible to omit an application load operation to the engine to this, it is possible to omit an application load operation to the engine unit which would be ineffective.

Furthermore, with the communication terminal device of the present invention, said host unit may further comprise a wireless communication unit, connected to said host processor, for performing wireless communication with a base station of a mobile communication network. In other words, the communication terminal device of the present invention can be used as a mobile communication terminal.

As has been explained above, by employing the coordinated operation method of the present invention, in a structure which includes a host unit which performs processing related to communication with the exterior and an engine unit which executes predetermined functions under the management of the host unit, it is possible to perform processing related to an application in a mutually coordinated manner, while logically apportioning this processing between the host unit and the engine unit.

Furthermore, according to the communication terminal device of the present invention, while including a host unit which performs processing related to communication with the exterior and an engine unit which executes predetermined functions under the management of the host unit, it is possible to perform processing related to an application in a mutually coordinated manner, while logically apportioning this processing between the host unit and the engine unit.

BRIEF DESCRIPTION OF DRAWINGS

FIG. 1A is an elevation view showing the external appearance of a cellular phone according to an embodiment of the present invention;

FIG. 1B is a right side view showing the external appearance of this cellular phone according to an embodiment of the present invention;

FIG. 1C is a rear view showing the external appearance of this cellular phone according to an embodiment of the present invention;

FIG. 3 is a figure for explanation of the contents of a non-volatile region in a storage unit of a host unit of FIG. 2, and of the contents of a recording medium;

FIG. 5 is a figure for explanation of the structure of a program for the host of FIG. 3;

DETAILED DESCRIPTION

In the following, an embodiment of the present invention will be described with reference to FIGS. 1A through 13.

Figure 2:
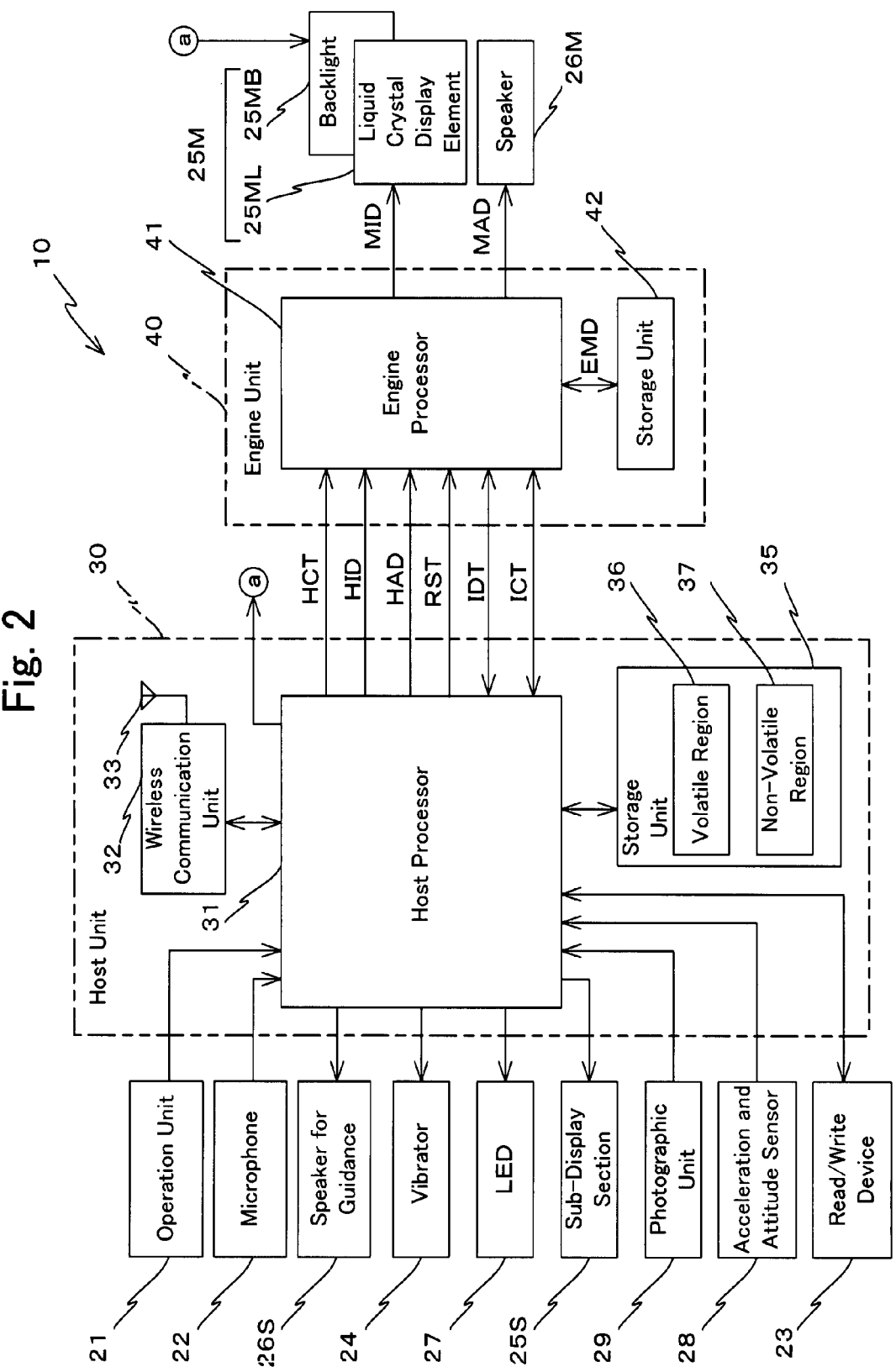
FIG. 2 is a block diagram for explanation of the functional structure of the cellular phone of FIG. 1.

In FIGS. 1A through 2, there is schematically shown the structure of a cellular phone 10, which is a communication terminal device according to an embodiment. This cellular phone 10 is a so called clamshell type cellular phone which can be folded up. Here, an elevation view of the external appearance of the cellular phone 10 in its opened state is shown in FIG. 1A; a right side view of the external appearance of the cellular phone 10 in its opened up state is shown in FIG. 1B; and a rear surface view of the cellular phone 10 in its opened up state is shown in FIG. 1C. Furthermore, the functional block structure of this cellular phone 10 is shown in FIG. 2.

As shown in FIGS. 1A through 1C, this cellular phone 10 comprises a first portion 11 and a second portion 12 which can be rotated with respect to that first portion 11 around a shaft AX1 as a center axis.

As shown in FIG. 1A, upon the first portion 11 there are disposed (a) an operation unit 21 upon which there are arrayed a tenkey pad and various actuation keys such as function keys and the like, and (b) a microphone 22 for inputting voice during a telephone conversation or the like. Furthermore, as shown in FIG. 1C, upon the rear surface side when that surface of the first portion 11 upon which the operation unit 21 is disposed is faced to the front, there is disposed (c) a speaker for guidance 26S for issuing ring tones or guidance sounds. Moreover, in the interior of the first portion, there is disposed (d) a read/write device 23 for reading out data which is recorded upon a transportable recording medium PRM such as a memory card or the like, and for writing data upon this recording medium PRM.

As shown in FIG. 1A, on the second portion 12, there are disposed (a) a main display section 25M which displays actuation guidance, operational states, received messages, the results of photography by a photographic unit 29 which will be described hereinafter, images due to applications, and the like; (b) a speaker 26M which replays audio signals which have arrived during a telephone conversation from the opposite party to communication; and (c) a LED (Light Emitting Diode) 27 for attracting the attention of the user. Furthermore, as shown in FIG. 1C, on the rear surface side of the second portion 12 when the display surface of the main display section 25M is faced to the front, there are disposed (c) a sub-display section 25S which performs auxiliary display, and (g) the photographic unit 29 which photographs an image within the field of view of its imaging optical system. Here, as shown in FIG. 2, the main display section 25M comprises a liquid crystal display element 25ML and a backlight 25MB.

Moreover, as shown in FIG. 2, this cellular phone 10 further comprises (h) a vibrator 24 for notifying the user of the arrival of a signal by vibrating the cellular phone 10 when a signal has arrived, and (i) an acceleration and attitude sensor 28 for detecting the acceleration at which the cellular phone 10 is operating, and the attitude of the cellular phone 10. This vibrator 24 and acceleration and attitude sensor 28 are provided in the interior of the cellular phone 10.

Furthermore, the cellular phone 10 comprises (j) a host unit 30 for fulfilling its basic functions as a cellular phone, such as its communication function and so on, and (k) an engine unit 40 which performs execution of applications. This host unit 30 and engine unit 40 are provided in the interior of the cellular phone 10.

The host unit 30 comprises a host processor 31 which performs overall control of the entire cellular phone 10, a wireless communication unit 32 for performing transmission and reception of communication signals via an antenna 33, and a storage unit 35 which stores programs and data. Here, the wireless communication unit 32 and the storage unit 35 are connected to the host processor 31. Moreover, the above described operation unit 21, microphone 22, read/write device 23, speaker for guidance 26S, LED 27, sub-display section 25S, vibrator 24, acceleration and attitude sensor 28, and backlight 25MB of the main display section 25M are also connected to the host processor 31.

The host processor 31 is endowed with the function of a central processing device (CPU), and is also endowed with the function of a digital signal processor (DSP). And, by the host processor 31 reading out and executing a program for the host 38 (refer to FIG. 3) which is stored in the storage unit 35, basic functional operations are performed such as communication functional operations and the like, and also exchange of various types of data with the engine unit 40.

The storage unit 35 comprises a volatile region 36 for temporarily storing various kinds of data, and a non-volatile region 37 for storing programs and the like permanently. Here, it is supposed that a contract number storage region, which includes a contracted country code on a SIM (Subscriber Identification Module) card not shown in the figures, is also included in the non-volatile region 37. The volatile region 36 comprises a volatile storage element whose stored contents are not preserved if operating electrical power ceases to be supplied. Furthermore, the non-volatile region 37 comprises a non-volatile storage element whose stored contents are preserved even if operating electrical power ceases to be supplied. Here, as shown in FIG. 3, in this non-volatile region 37, in addition to the above described program for the host 38, there are also stored a terminal region code TRC which is allocated to the cellular phone 10, and an engine overall control program $39_0$ and engine applications $39_1$, $39_2$, ... $39_M$. Moreover, engine applications $39_{M+1}$, ... are stored upon the recording medium PRM. Here, as the terminal region code TRC, three types of data are employed: a manufacture number code which is allocated during manufacture, the contracted country code which is stored upon the SIM card, and a current zone region code which is notified from the base station of the current zone cell in which communication is being performed. It should be understood that, when the current zone cell changes, it is arranged for the current zone region code which is included in the terminal region code TRC to be updated.

Figure 4A:
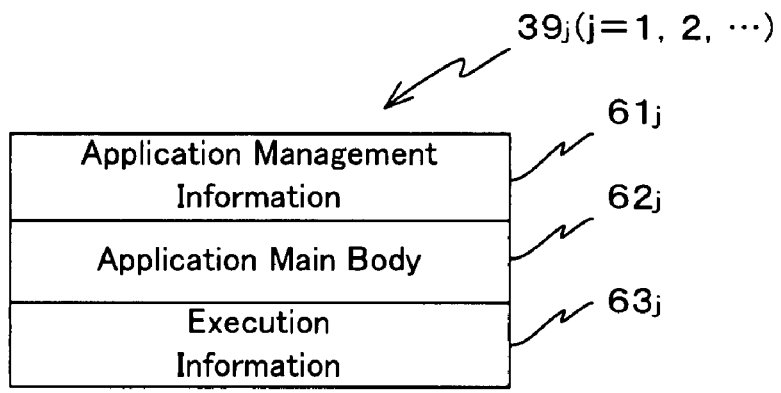
FIG. 4A is a figure for explanation of the structure of an engine application of FIG. 3.

As shown in FIG. 4A, each of the engine applications $39_j$ (where j=1, 2, ... ) comprises application management information $61_j$, an application main body $62_j$ which is to be actually executed by the engine unit 40, and execution information $63_j$ for after acquisition of said application. Here, the application management information and the application main body are determined when creating the engine application $39_j$. On the other hand, the execution information $63_j$ is updated after acquisition of the engine application $39_j$. It should be understood that, in the following explanation, "execution of the engine application $39_j$" and "execution of the application main body $62_j$" are used with the same meaning.

Figure 4B:
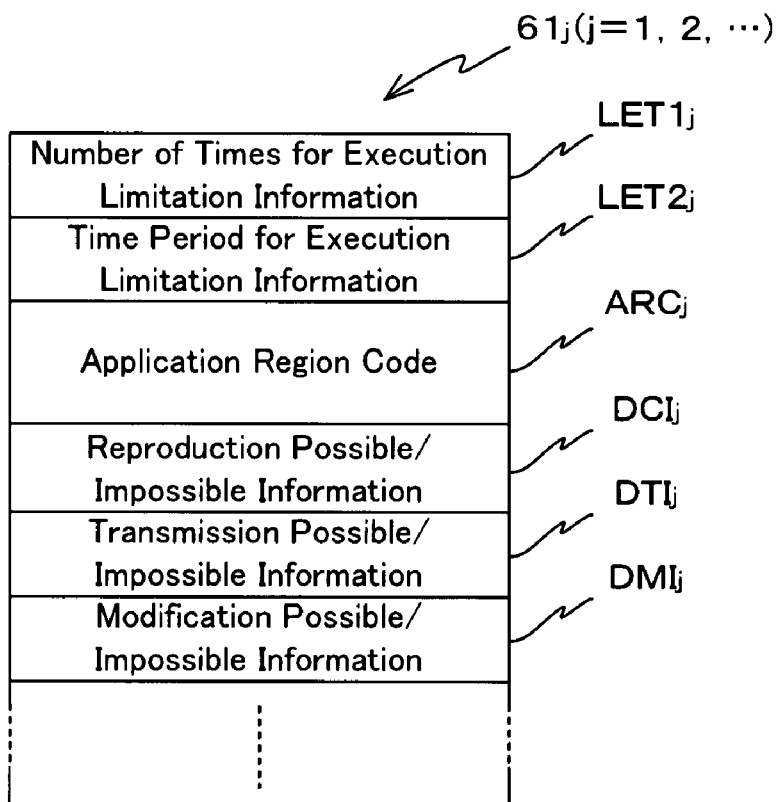
FIG. 4B is a figure for explanation of the structure of application management information of FIG. 4A.

As shown in FIG. 4B, in the application management information $61_j$, there are included number of times for execution limitation information $LET1_j$, time period for execution limitation information $LET2_j$, and an application region code $ARC_j$. Furthermore, in the application management information $61_j$, there are included reproduction possible/impossible information $DCI_j$, transmission possible/impossible information $DTI_j$, and modification possible/impossible information $DMI_j$.

The number of times for execution limitation information $LET1_j$ specifies the number of times that the engine application $39_j$ may be executed. Moreover, the time period for execution limitation information $LET2_j$ specifies a time period within which the engine application $39_j$ may be executed.

The application region code $ARQ_j$ specifies the code of the region in which the device which executes the engine application $39_j$ must be present. As this application region code $ARC_j$, one or more region codes are designated for each type of the ones among the above described manufacture number code, contracted country code, and current zone region code which are adopted. And, if the terminal region code TRC of the cellular phone 10 agrees with one among the region codes which are designated as the application region codes $ARC_j$, then this application region code ARC and the terminal region code TRC match, and it is arranged for execution of the engine application $39_j$ by the cellular phone 10 to be permitted.

The reproduction possible/impossible information $DCI_j$ specifies whether or not reproduction of the engine application $39_j$ is permitted. Furthermore, the transmission possible/impossible information $DTI_j$ indicates whether or not transmission of the engine application $39_j$ which has been acquired to another device via a communication circuit is permitted. Moreover, the modification possible/impossible information $DMI_j$ indicates whether or not modification of the engine application $39_j$, by changing the color adjustment upon its screen display or the like, is permitted.

Figure 4C:
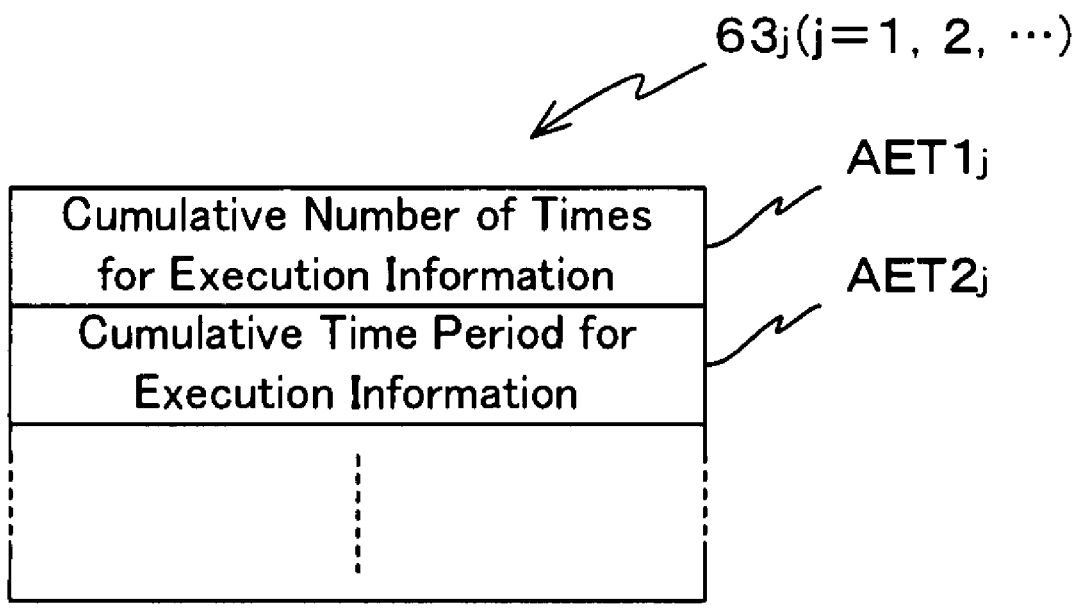
FIG. 4C is a figure for explanation of the structure of execution information of FIG. 4A.

As shown in FIG. 4C, cumulative number of times for execution information $AET1_j$ and cumulative time period for execution information $AET2_j$ are included in the execution information $63_j$. Here, the cumulative number of times for execution information $AET1_j$ specifies the cumulative number of times that the application $39_j$ may be executed. Moreover, the cumulative time period for execution information $AET2_j$ specifies the cumulative time period over which the application $39_j$ may be executed.

As shown in FIG. 5, the program for the host 38 comprises (i) an overall control unit 79 which, when the user has issued a command related to the engine application $39_j$ from the operation unit 21, along with analyzing this command, and performing display upon the main display section 25M, also performs overall control of the entire cellular phone 10, and (ii) an application acquisition unit 71 which, when an application acquisition command has been issued by the user, acquires an engine application via the wireless communication unit 32, and stores it in the non-volatile region 37. It should be understood that although, in FIG. 5, the overall control unit 79 is only explicitly shown as directly accessing the operation unit 21 and the main display section 25M, actually this overall control unit 79 is able to access all of the resources which are connected to the host unit 30 in FIG. 2 described above.

Figure 6:
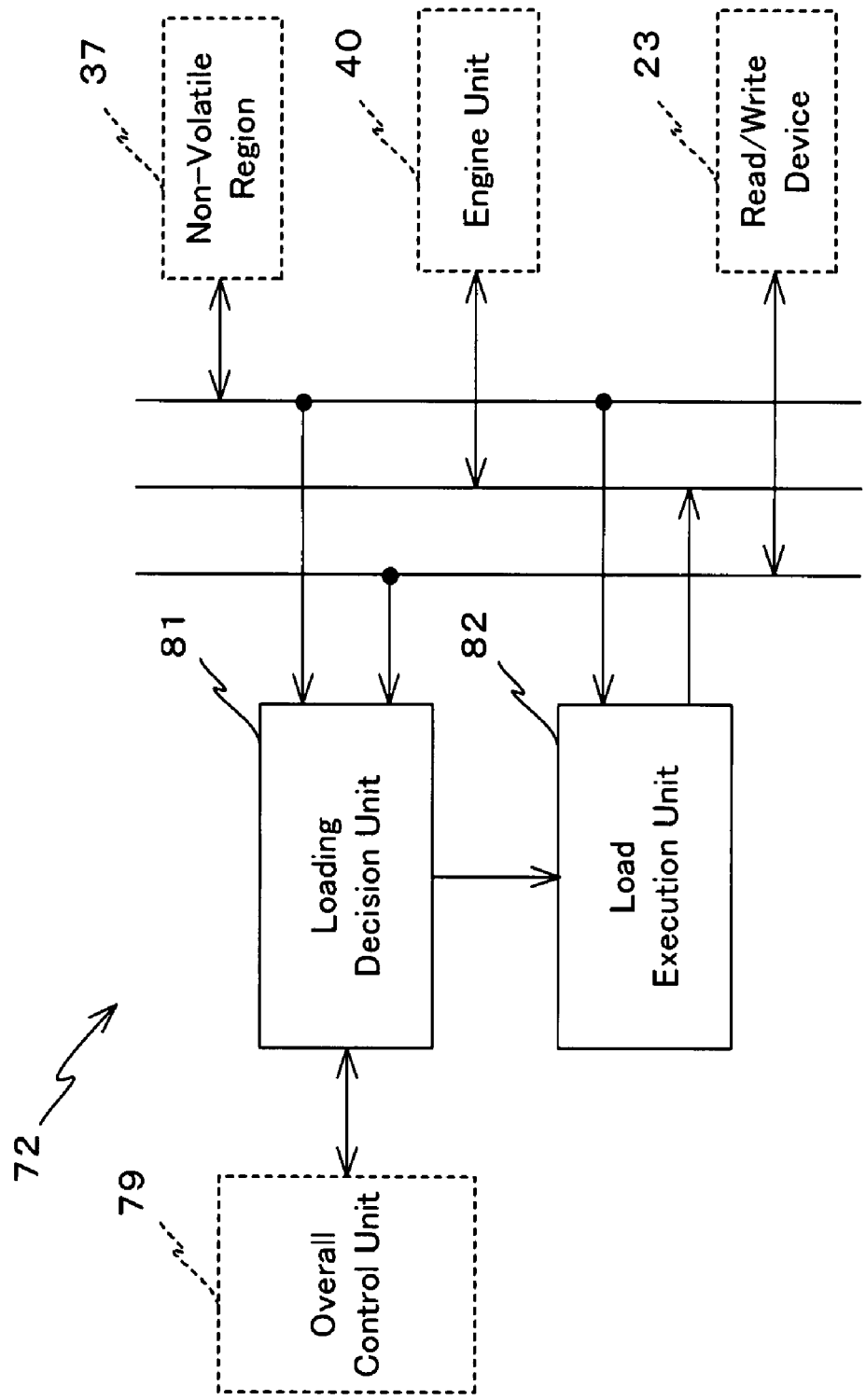
FIG. 6 is a figure for explanation of the structure of an application load unit of FIG. 5.

Furthermore, the program for the host 38 comprises (iii) an application load unit 72 which, when an application load command for the engine application $39_j$ has been issued by the user to the engine unit 40, reads out the engine application main body $62_j$ from the non-volatile region 37, or from a recording medium PRM which has been installed to the read/write device 23, and loads it to the engine unit 40. Here, as shown in FIG. 6, this application load unit 72 comprises a loading decision unit 81 which makes a decision as to whether or not it is possible to load the engine application main body $62_j$ to the engine load unit 40, based upon the terminal region code TRC and the application management information $61_j$ and the execution information $63_j$ of the engine application $39_j$, and a load execution unit 82 which loads the engine application main body $62_j$ to the engine load unit 40 if the decision result by this loading decision unit 81 is affirmative.

Returning to FIG. 5, the program for the host 38 comprises (iv) an application execution control unit 73 which, along with sending an application execution command with the identifier of the engine application $39_j$ set as a parameter to the engine unit 40 when an execution command for the engine application $39_j$ has been issued by the user, also sends an application stop command with the identifier of the engine application $39_j$ set as a parameter to the engine unit 40 when a stop command for the engine application $39_j$ has been issued by the user; and (v) a time period for execution monitor unit 74 which monitors the cumulative time period for execution of the engine application $39_j$.

Figure 7:
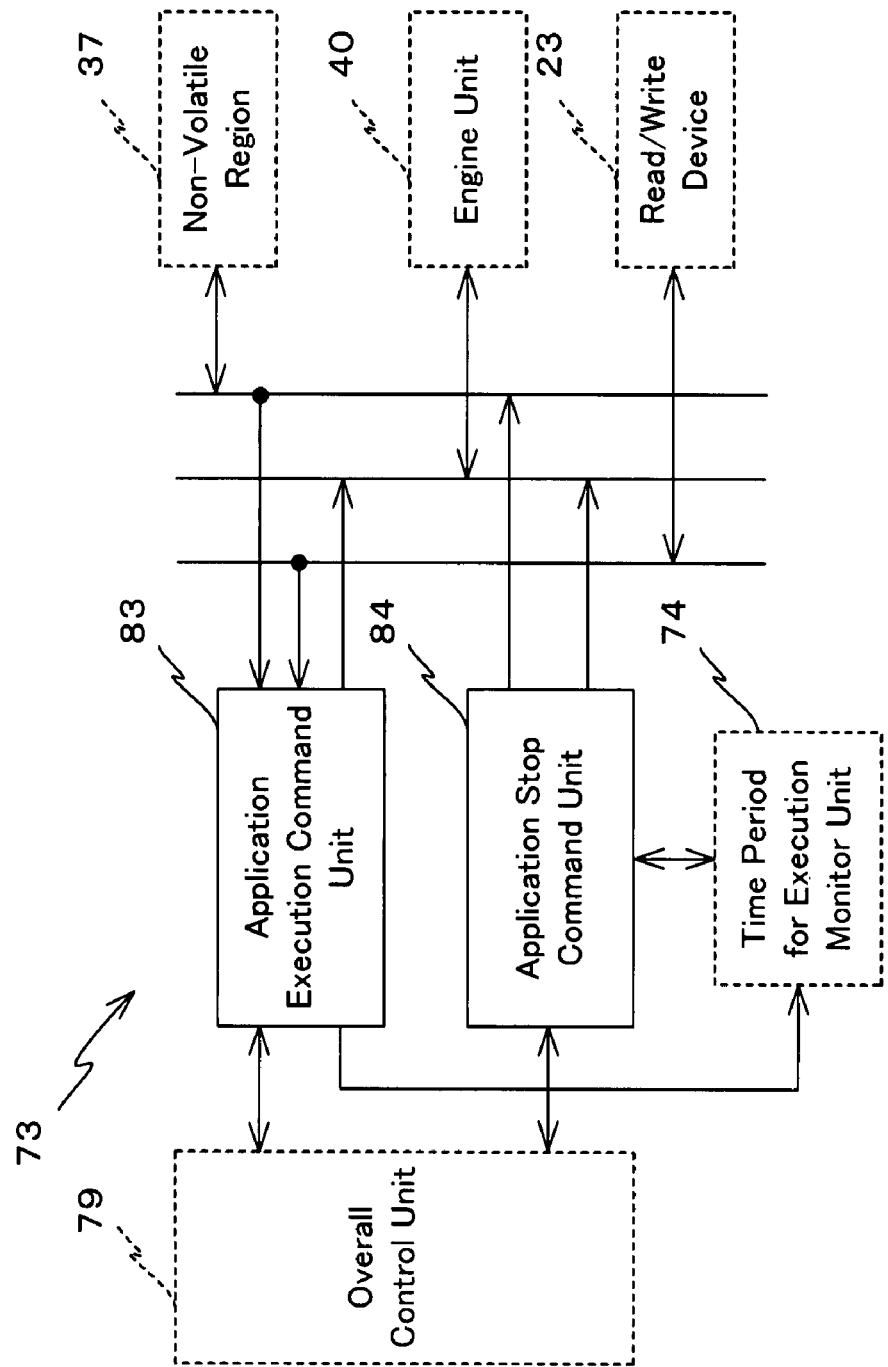
FIG. 7 is a figure for explanation of the structure of an application execution control unit of FIG. 5.

As shown in FIG. 7, this application execution control unit 73 comprises an application execution command unit 83 which sends an execution command or a resume command for the engine application $39_j$ to the engine unit 40, when an execution command or a resume command for the engine application $39_j$ has been issued by the user. Furthermore, the application execution control unit 73 further comprises an application stop command unit 84 which sends a stop command or a resume command for the engine application $39_j$ to the engine unit 40, when a stop command or a resume command for the engine application $39_j$ has been issued by the user. Note that it should be understood that the application stop command unit 84 sends a stop command for the engine application $39_j$ to the engine unit 40, if the fact has been notified from the time period for execution monitor unit 74 that the cumulative time period for execution have arrived at the limit time period for execution. Herein, when a stop command or a pause command for the engine application $39_j$ is sent to the engine unit 40, this application stop command unit 84 notifies this fact to the time period for execution monitor unit 74, and acquires the cumulative time period for execution for the engine application $39_j$ up to this time point. And it is arranged for the application stop command unit 84 to store the cumulative time period for execution which it has thus acquired in an execution information unit $63_j$ for the engine application $39_j$ within the non-volatile region 37 as a new cumulative time period for execution.

Figure 8:
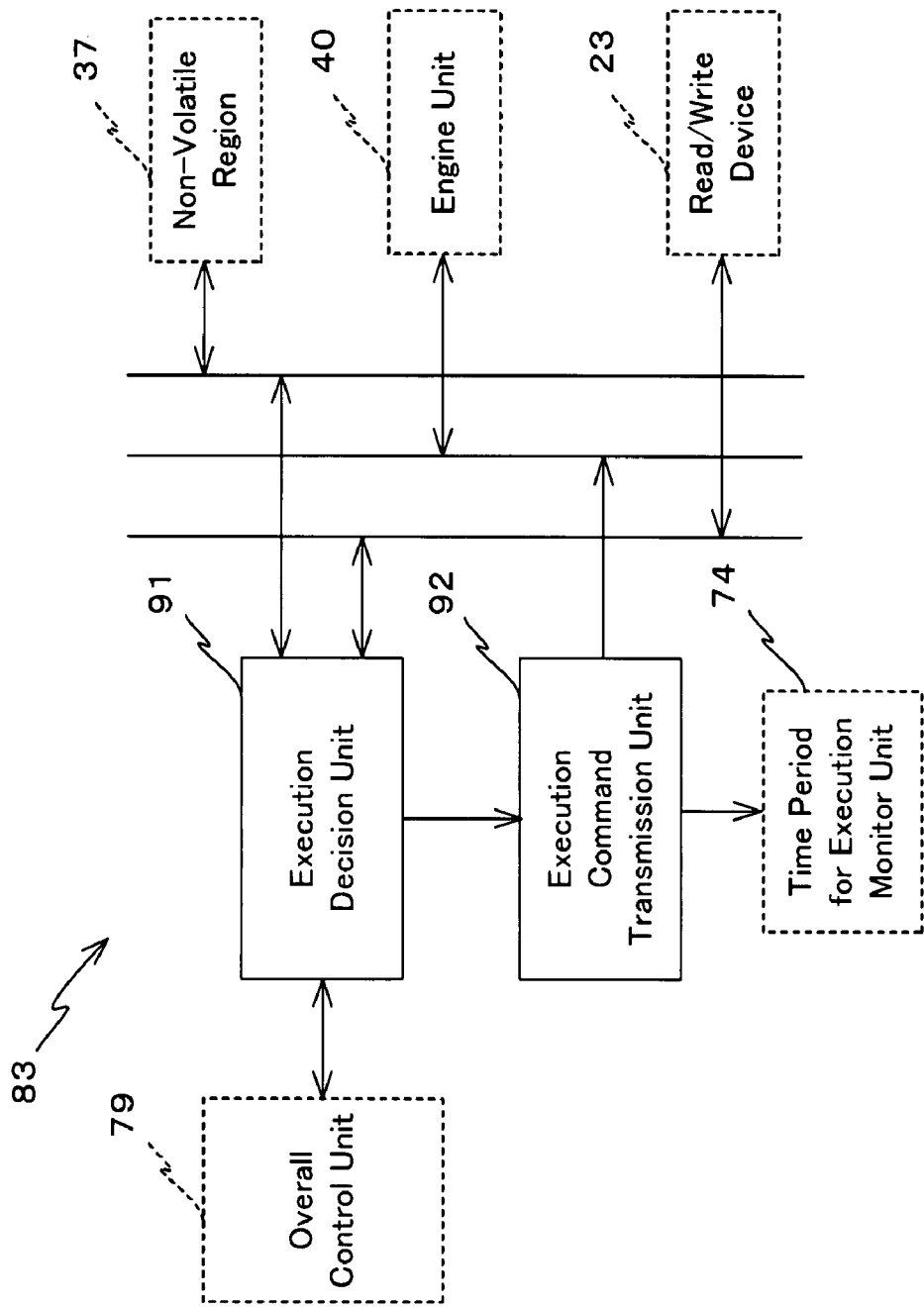
FIG. 8 is a figure for explanation of the structure of an application execution command unit of FIG. 7.

As shown in FIG. 8, the application execution command unit 83 comprises an execution decision unit 91 which decides whether or not it is possible to execute the engine application $39_j$, based upon the terminal region code TRC, and the application management information $61_j$ and the execution information $63_j$ of the engine application $39_j$, and an execution command transmission unit 92 which, if the result of this decision by the execution decision unit 91 is affirmative, sends an execution command for the engine application $39_j$ to the engine unit 40. Here, if the cumulative number of times for execution is limited by the number of times for execution limitation information $LET1_j$, when the result of this decision is affirmative, then the execution decision unit 91 adds one to the cumulative number of times for execution, and stores it as the new cumulative number of times for execution in the execution information unit $63_j$ for the engine application $39_j$ in the non-volatile region 37. Furthermore, if the cumulative number of times for execution is limited by the time period for execution limitation information $LET2_j$, when the result of this decision is affirmative, then it is arranged for the execution decision unit 91 to notify the time period for execution monitor unit 74 of the cumulative time period for execution at this time point, and of the cumulative time period for execution limitation information of the engine application $39_j$.

Figure 9:
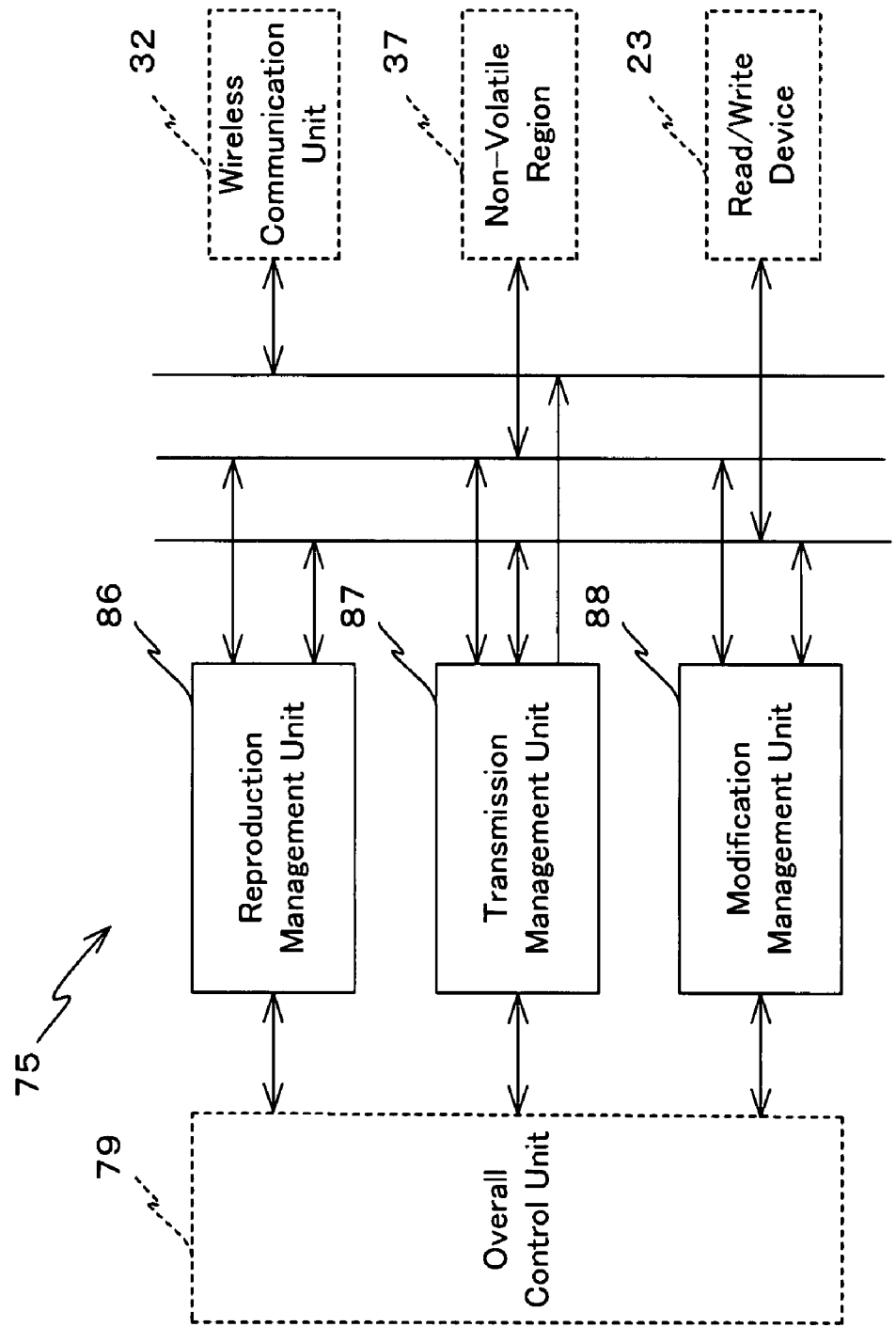
FIG. 9 is a figure for explanation of the structure of a management unit for reproduction and so on of FIG. 5.

Returning to FIG. 5, the program for the host 38 comprises (iv) a management unit for reproduction and the like 75, which manages reproduction, transmission and modification of the engine application $39_j$. As shown in FIG. 9, this management unit for reproduction and the like 75 comprises a reproduction management unit 86, a transmission management unit 87, and a modification management unit 88. Here, when a reproduction command for the engine application $39_j$ has been issued by the user, based upon the reproduction possible/impossible information $DCI_j$ for this engine application $39_j$, the reproduction management unit 86 makes a decision as to whether or not reproduction of the engine application $39_j$ is permitted, and, if the result of this decision is affirmative, performs reproduction of the engine application $39_j$. Furthermore, when a transmission command for the engine application $39_j$ has been issued by the user, based upon the transmission possible/impossible information $DTI_j$ for this engine application $39_j$, the transmission management unit 87 makes a decision as to whether or not transmission of the engine application $39_j$ is permitted, and, if the result of this decision is affirmative, performs transmission of the engine application $39_j$ via the wireless communication unit 32. Moreover, when a modification command $DMI_j$ for the engine application $39_j$ has been issued by the user, based upon the modification possible/impossible information for this engine application $39_j$, the modification management unit 88 makes a decision as to whether or not modification of the engine application $39_j$ is permitted, and, if the result of this decision is affirmative, performs modification of the engine application $39_j$.

Returning to FIG. 2, the engine unit 40 comprises an engine processor 41 which performs overall control of the entire engine unit 40, and a storage unit 42 for programs executed by the engine processor 41 and for data. Here, the storage unit 42 is connected to the engine processor 31. Furthermore, the liquid crystal display section 25ML of the above described main display section 25M and the speaker 26M are connected to the engine processor 41.

Figure 10:
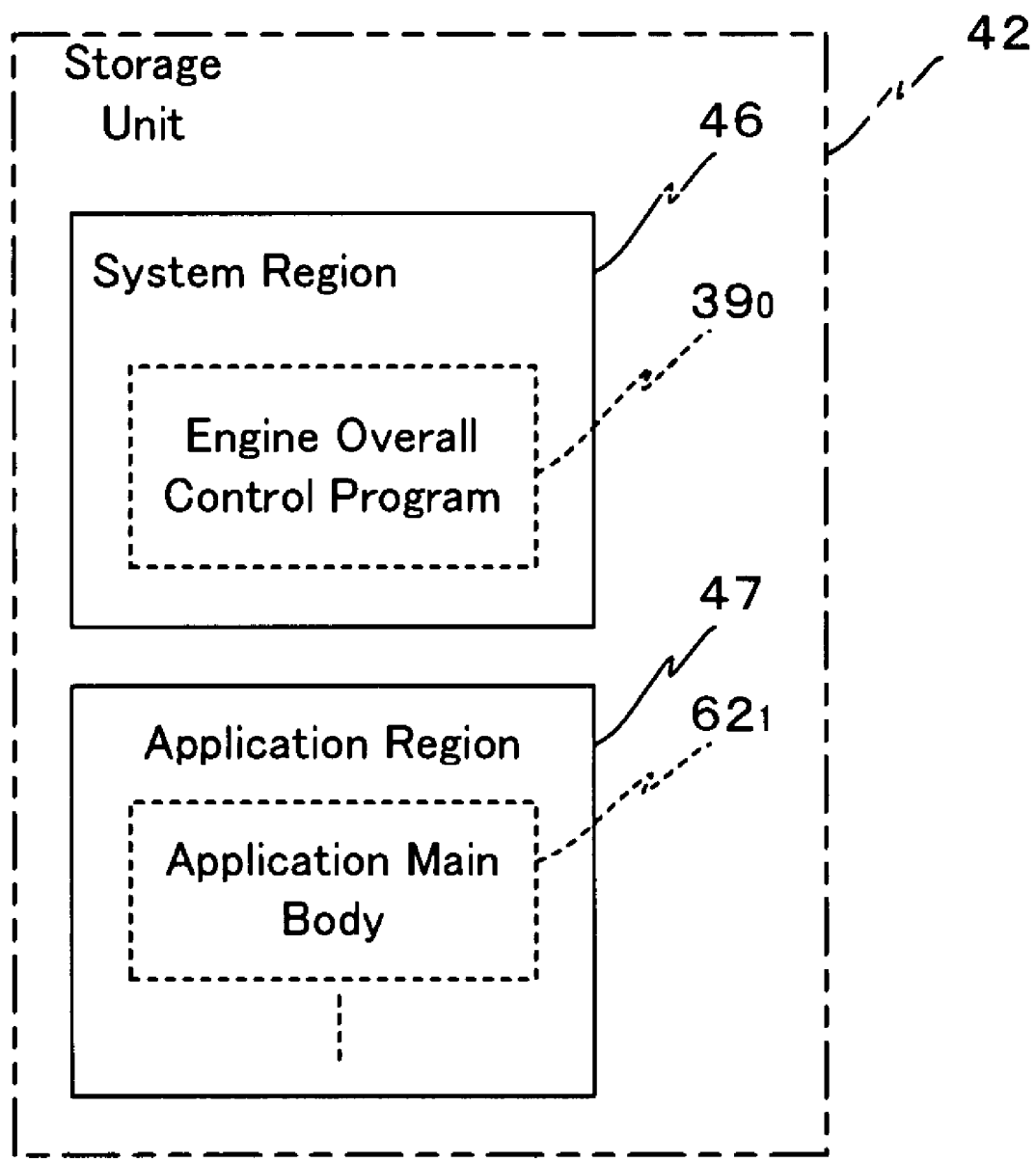
FIG. 10 is a figure for explanation of the structure of a storage unit of an engine unit of FIG. 2.

The storage unit 42 is constituted by a volatile storage element of which the storage contents are not guaranteed when operating electrical power ceases to be supplied. Here, as shown in FIG. 10, in this storage unit 42, there are included a system region 46 which stores the above described engine overall control program $39_0$, and an application region 47 in which described any one or more of the application main bodies $62_1$, $62_2$, . . . is stored.

Figure 11:
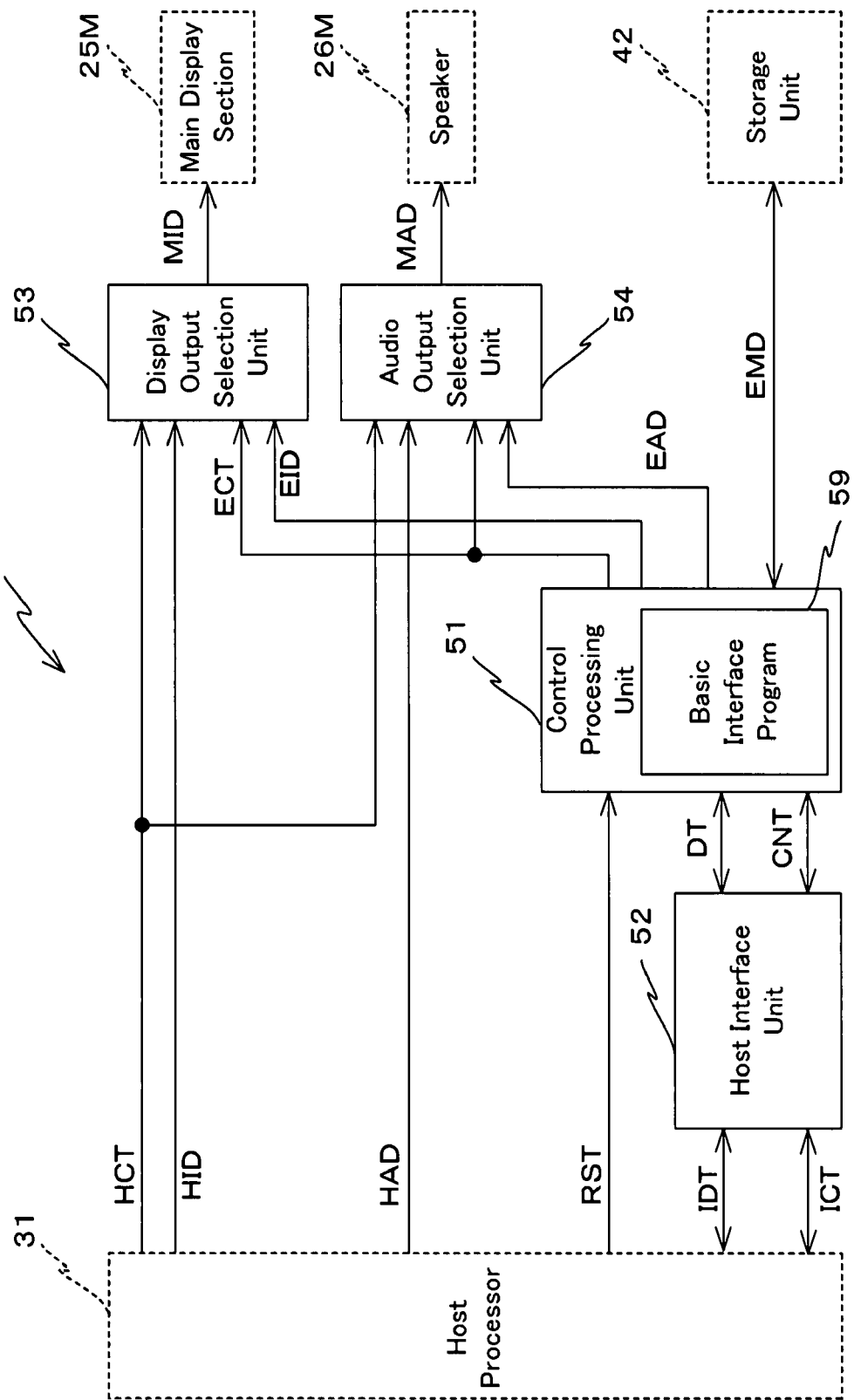
FIG. 11 is a block diagram for explanation of the structure of an engine processor of FIG. 2.

As shown in FIG. 11, the engine processor 41 comprises a control processing unit 51 and a host interface unit 52. Furthermore, this engine processor 41 comprises a display output selection unit 53 for selecting any one of a host display image signal HID from the host unit 30, and an engine display image signal EID from the control processing unit 51, as a display image signal MID which is to be supplied to the liquid crystal display element 25ML, and for supplying it to the liquid crystal display element 25ML. Yet further, the engine processor 41 comprises an audio output selection unit 54 for selecting any one of a host audio signal HAD from the host unit 30, and an engine audio signal EAD from the control processing unit 51, as an audio signal MAD which is to be supplied to the speaker 26M, and for supplying it to the speaker 26M.

At the stage before the execution of the above described engine overall control program $39_0$ is started, a basic interface program 59 for controlling the operation of the engine unit 40, including operations for interfacing with the host unit 30, is stored in the control processing unit 51. Furthermore, the control processing unit 51 is endowed with a three dimensional graphic processing function and an audio generation processing function, and, when any one of the above described engine applications $39_1$, $39_2$, . . . is executing, it exerts this three dimensional graphic processing function and this audio generation processing function.

The host interface unit 52 is positioned between the host unit 30 and the control processing unit 51, and performs various types of command for transfer with the host unit 30 and buffering of various types of data, and also acts as intermediary for various types of control signal. This host interface unit 52 includes a two-port RAM (Random Access Memory) element.

At one of the ports of the two-port RAM element in the host interface unit 52, it is connected to the control processing unit 51 by an internal data signal DT and an internal control signal CNT. Here, in this internal control signal, CNT, there are included internal read out command signals from the two-port RAM, internal write command signals to the two-port RAM, and so on, which the control processing unit 51 issues to the host interface unit 52. Furthermore, in this internal control signal CNT, there are included internal interrupt signals which indicate that data has been sent from the host unit 30 to the engine unit 40 and the like, which the host interface unit 52 issues to the control processing unit 51.

Furthermore, at the other port of the two-port RAM element in the host interface unit 52, it is connected to the host unit 51 by an interface data signal IDT and an interface control signal ICT, for example in 8-bit parallel. Here, in this interface control signal ICT, there are included interface read out command signals from the two-port RAM, interface write command signals to the two-port RAM, and so on, which the host unit 30 issues to the host interface unit 52. Furthermore, in this interface control signal ICT, there are included interface interrupt signals which indicate that data has been sent from the engine unit 40 to the host unit 30 and the like, which the host interface unit 52 issues to the host unit 30.

By exchanging signals of the type described above, according to requirements, it is arranged to perform transfer of commands and responses, accompanied by appended data, between the host unit 30 and the engine unit 40 via the host interface unit 52.

One of the host display image signal HID and the engine display image signal EID is selected as the display image signal MID by the display output selection unit 53, in the following manner, according to the signal levels of the host output control signal HCT from the host unit 30 and the engine output control signal ECT from the control processing unit 51. Here, if the signal level of the host output control signal HCT is a significant level, and it is being specified by the host output control signal HCT that the host display image signal HID should be selected, then, irrespective of the signal level of the engine output control signal ECT, the display output selection unit 53 selects the host display image signal HID and outputs it as the display image signal MID. On the other hand, if the signal level of the host output control signal HCT is an insignificant level, then the display output selection unit 53 selects one of the host display image signal HID and the engine display image signal EID as the display image signal MID, according to the signal level of the engine output control signal ECT.

In other words, if the signal level of the host output control signal HCT is an insignificant level, and moreover the signal level of the engine output control signal ECT is a significant level, then the engine display image signal EID is selected by the display output selection unit 53, and is outputted as the display image signal MID. Furthermore, if the signal level of the host output control signal HCT is an insignificant level, and moreover the signal level of the engine output control signal ECT is an insignificant level, then the host display image signal HID is selected by the display output selection unit 53, and is outputted as the display image signal MID.

One of the host audio signal HAD and the engine audio signal EAD is selected and is outputted as the audio signal MAD by the audio output selection unit 54, in the same manner as in the case of the display output selection unit 53 as described above, according to the signal levels of the host output control signal HCT and the engine output control signal ECT. In other words, if the signal level of the host output control signal HCT is a significant level, then, irrespective of the signal level of the engine output control signal ECT, the audio output selection unit 54 selects the host audio signal HAD and outputs it as the audio signal MAD. Furthermore, if the signal level of the host output control signal HCT is an insignificant level, and moreover the signal level of the engine output control signal ECT is a significant level, then the audio output selection unit 54 selects and outputs the engine audio signal EAD as the audio signal MAD. Furthermore, if the signal level of the host output control signal HCT is an insignificant level, and moreover the signal level of the engine output control signal ECT is an insignificant level, then the audio output selection unit 53 selects the host audio signal HAD and outputs it as the audio signal MAD.

Next, the coordinated operation of the host unit 30 and the engine unit 40 in this cellular phone 10 having the structure described above will be explained.

—Initial Operation—

First, the initial operation of this cellular phone 10 will be explained.

When the power supply for this cellular phone 10 is turned ON, along with the host unit 30 being initialized, the supply of electrical power to the engine unit 40 for its operation, and the supply of a basic clock signal for its operation, is started. When this supply of the electrical power for operation and of the basic clock signal for operation is started, the control processing unit 51 performs an initialization operation for the engine unit 40 so that it goes into the idling state, and the above described basic interface program 59 is executed by the control processing unit 51. It should be understood that, if it has been detected by the engine unit 40 that a reset command signal RST has been issued from the host unit 30, then it is arranged for the control processing unit 51 to perform an initialization operation so that it goes into the idling state, and for the above described basic interface program 59 to be executed by the control processing unit 51.

It should be understood that, when the host unit 30 is initialized, the host unit 30 (in more detail, the overall control unit 79 in the program for the host which is executed by the host processor 31) sets the signal level of the host output control signal HCT to a significant level. As a result, the host display image signal HID is supplied via the display output selection unit 53 to the liquid crystal display element 25ML as the display screen signal MID. Furthermore, the host audio signal HAD is supplied via the audio output selection unit 53 to the speaker 26M as the audio signal MAD. As a result, when the host unit 30 is initialized, the liquid crystal display element 25ML and the speaker 26M come under the control of the host unit 30.

Furthermore, when the engine unit 40 is initialized, the signal level of the engine output control signal ECT is set to an insignificant level by the engine unit 40. As a result, irrespective of the signal level of the host output control signal HCT, the liquid crystal display element 25ML and the speaker 26M come under the control of the host unit 30.

Furthermore, when the engine unit 40 is initialized along with the power supply being turned ON, this does not go as far as initialization of the contents of the storage unit 42. Due to this, the entire storage contents of the whole region of the storage unit 42 become indeterminate.

As described above, after the initialization of the host unit 30 and the engine unit 40 have been performed, initial loading processing is performed, from loading of the engine overall control program $39_O$ to the engine unit 40 up to the start of execution thereof.

In this initial loading processing, first, the host unit 30 sends an initial program load command to the engine unit 40, with the engine overall control program $39_O$ being set as appended data. At this time, the host unit 30 reads out the engine overall control program $39_O$ from the non-volatile region 37 of the storage unit 35. Next, the host unit 30 sends an initial program load command as transmitted data to the engine unit 40, with this engine overall control program $39_O$ being set thereto as appended data.

Upon receipt of this initial program load command by the engine unit 40 with the engine overall control program $39_O$ set as appended data, the control processing unit 51 stores in the system region 46 of the storage unit 42 the engine overall control program $39_O$ which has been sent from the host unit 30 as appended data to the initial program load command and has arrived. And the control processing unit 51 notifies a report to the host unit 30 to the effect that the loading of the engine overall control program $39_O$ has been completed.

Upon receipt of this notification, the host unit 30 sends an execution start command for the engine overall control program $39_0$ to the engine unit 40 as transmitted data, without any appended data. Upon receipt of this execution start command for the engine overall control program $39_0$ by the engine unit 40, the control processing unit 51, along with starting the execution of the engine overall control program $39_0$, also notifies a report to the host unit 30 to the effect that the execution of the engine overall control program 390 has been started. The processing related to initial loading terminates in this manner.

—The Operation of Acquiring an Engine Application—

Next, the operation of acquisition of an engine application will be explained.

After the initial operation described above has been completed, when the user actuates the operation unit 21 and performs actuation input of an application acquisition command in which a server address upon the communication network which includes the mobile communication network is designated, the overall control unit 79 analyzes this actuation input data, and recognizes that an application acquisition command has been inputted. Next, the overall control unit 79 notifies the application acquisition unit 71 to the effect that this application acquisition command has been inputted, and of the server address.

Upon receipt of this notification, the application acquisition unit 71 accesses the server which has been designated via the wireless communication unit 32, utilizing the server address which has been notified. Next, the application acquisition unit 71 acquires from the server, via the wireless communication unit 32, the engine application which was designated by the actuation input by the user, utilizing the operation unit 21 and the main display section 25M via the overall control unit 79. And next, the application acquisition unit 71 stores this engine application which has been acquired in the non-volatile region 37 of the storage unit 35 as the engine application $39_k$ (where k=1, . . . , M). In this manner, application acquisition is performed with the cellular phone via the communication circuit.

On the other hand, application acquisition may also be performed via a recording medium PRM upon which an application $39_p$ (where p=M+1, . . . ) has been stored. In this case, by installing the recording medium PRM into the read/write device 23 for the recording medium PRM, application acquisition is performed with the cellular phone 10 via the communication circuit.

—The Operation of Loading an Engine Application—

Next, the operation of loading an engine application will be explained.

After the acquisition operation for an application described above has been completed, when the user actuates the operation unit 21 and performs actuation input of a load command for an engine application designated by the identifier "the engine application $39_j$" (where j=1, 2, . . . ) (hereinafter this will also sometimes simply be termed the "application identifier"), then the overall control unit 79 analyzes the actuation input data, and recognizes that the load command for the application has been inputted. And next, the overall control unit 79 notifies the application load unit 72 to the effect that this application load command has been inputted, and of the application identifier.

Figure 12:
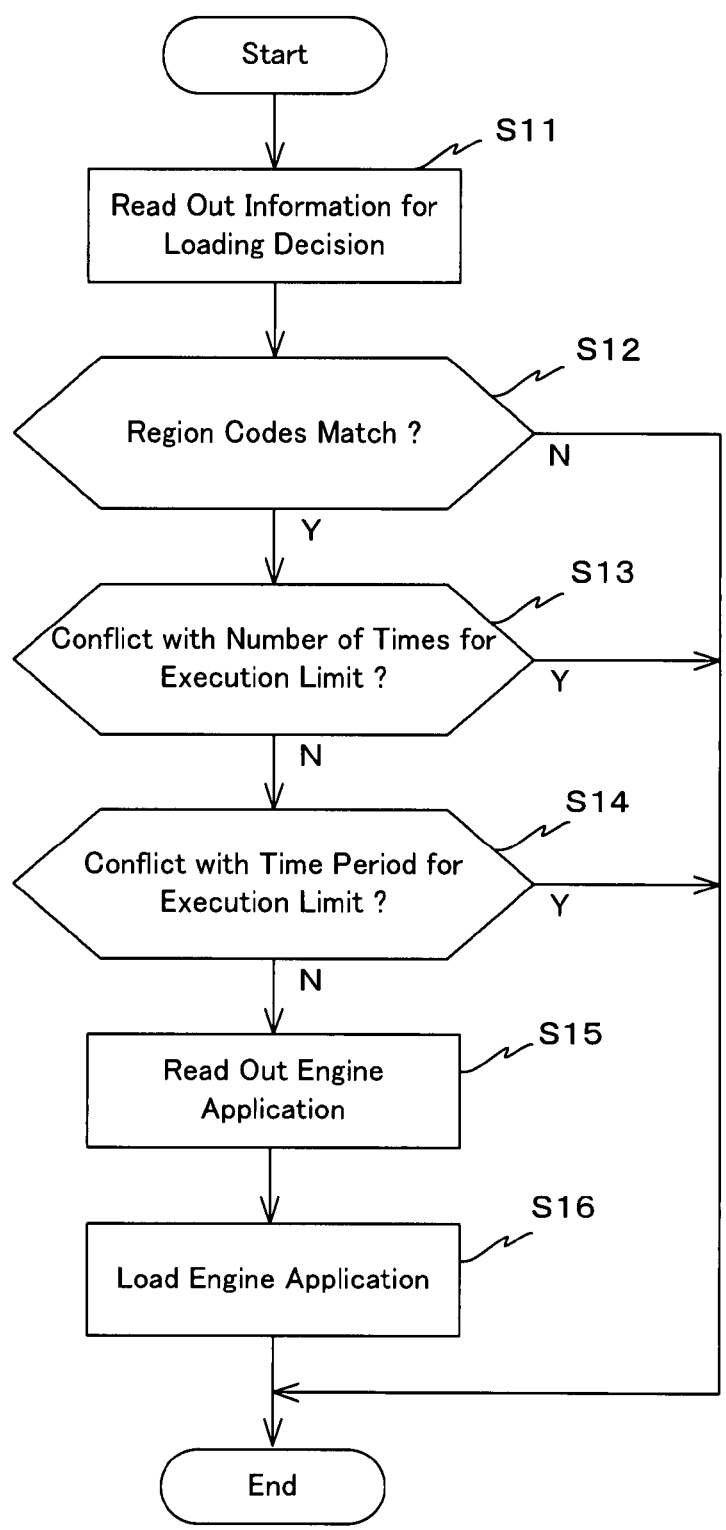
FIG. 12 is a flow chart for explanation of application loading processing by the cellular phone of FIG. 1.

When the application load unit 72 receives this notification, as shown in FIG. 12, in a step S1, the loading decision unit 81 reads out the terminal region code TRC and the application management information $61_j$ and the execution information $63_j$ for the engine application $39_j$ from the non-volatile region 37 or the recording medium PRM, as information for loading decision, based upon the application identifier which has been notified. Next, in a step S12, the loading decision unit 81 decides whether or not to load the application main body $62_j$, according to whether or not the terminal region code TRC matches the application region code $ARC_j$.

In other words, if the terminal region code TRC does not match the application region code $ARC_j$, then, since execution of the application main body $62_j$ by the cellular phone 10 is not permitted, the loading decision unit 81 decides that this application main body $62_j$ which cannot be executed should not be loaded into the engine unit 40. It should be understood that it is arranged to perform this decision as to whether the terminal region code TRC matches the application region code $ARC_j$ or not, for each of the types employed among the above described manufacture number code, contracted country code, and current zone region code, according as to whether or not one of the region codes included in the application region codes $ARC_j$ and the terminal region code TRC agree with one another.

If the result of the decision in the step S12 is negative, since the region code does not match, the loading decision unit 81 reports to the overall control unit 79 to the effect that the engine application main body $62_j$ is not loaded into the engine unit 40. Upon receipt of this report, the overall control unit 79 reports the contents which have been thus reported from the loading decision unit 81 to the user by display upon the main display section 25M. And then the processing related to application loading terminates.

If the result of the decision in the step S12 is negative, then the flow of control proceeds to a step S13. In this step S13, the loading decision unit 81 decides, based upon the number of times for execution limitation information $LET1_j$ and the cumulative number of times for execution information $AET1_j$, whether or not the cumulative number of times for execution is in a state of conflicting with the number of times for execution limit, according as to whether or not it is within the number of times for execution limit. If this decision result is affirmative, then, since execution of the application main body $62_j$ by the cellular phone 10 is not permitted, accordingly it is decided that this application main body $62_j$ which cannot be executed should not be loaded into the engine unit 40. And, due to this state in which there is a conflict with the number of times for execution limit, the loading decision unit 81 reports to the overall control unit 79 to the effect that the engine application main body $62_j$ is not loaded into the engine unit 40. Upon receipt of this report, the overall control unit 79 reports the contents which have been thus reported from the loading decision unit 81 to the user by display upon the main display section 25M. And then the processing related to application loading terminates.

If the decision result in the step S113 is negative, then the flow of control proceeds to a step S14. In this step S14, the loading decision unit 81 decides, based upon the time period for execution limitation information $LET2_j$ and the cumulative time period for execution information $AET2_j$, whether or not the cumulative time period for execution is in a state of conflicting with the time period for execution limit, according as to whether or not it is within the time period for execution limit. If this decision result is affirmative, then, since execution of the application main body $62_j$ by the cellular phone 10 is not permitted, accordingly it is decided that this application main body $62_j$ which cannot be executed should not be loaded into the engine unit 40. And, due to this state in which there is a conflict with the time period for execution limit, the loading decision unit 81 reports to the overall control unit 79 to the effect that the engine application main body $62_j$ is not loaded into the engine unit 40. Upon receipt of this report, the overall control unit 79 reports the contents which have been thus reported from the loading decision unit 81 to the user by display upon the main display section 25M. And then the processing related to application loading terminates.

If the decision result in the step S14 is negative, then the flow of control proceeds to a step S15. In this step S15, the load execution unit 82 reads out the application main body $62_j$ from the non-volatile region 37 or the recording medium PRM, based upon the application identifier which has been notified. Next, in a step S16, the load execution unit 82 loads the application main body $62_j$ into the engine unit 40. This application loading processing is performed in the same manner as the above described initial program loading, except for the fact that the application main body $62_j$ is stored in the application region 47 of the storage unit 42. In other words, an application load command which takes the application main body $62_j$ from the load execution unit 82 as appended data is sent to the engine unit 40. Next the control processing unit 51, which has recognized that this is an application load command, reads out the application main body $62_j$ from the 2-port RAM of the host interface unit 52, and stores it in the application region 47 of the storage unit 42. And, when this storing of the application main body $62_j$ in the storage unit 42 is completed, the control processing unit 51 notifies a load completed report for the application main body $62_j$ to the host unit 30. In this manner, the processing related to application main body $62_j$ loading is completed.

—The Operation of Commanding the Execution of an Engine Application—

Next, the operation for controlling the execution of an engine application will be explained.

After the above described operation of loading an application has been completed, when the user actuates the operation unit 21 and performs actuation input of an application execution command which designates the identifier of the engine application $39_j$, the overall control unit 79 analyzes the actuation input data, and recognizes that an application execution command has been inputted. Next, the overall control unit 79 notifies the application execution control unit 72 to the effect that the application execution command has been inputted, and also notifies it of the application identifier.

Figure 13:
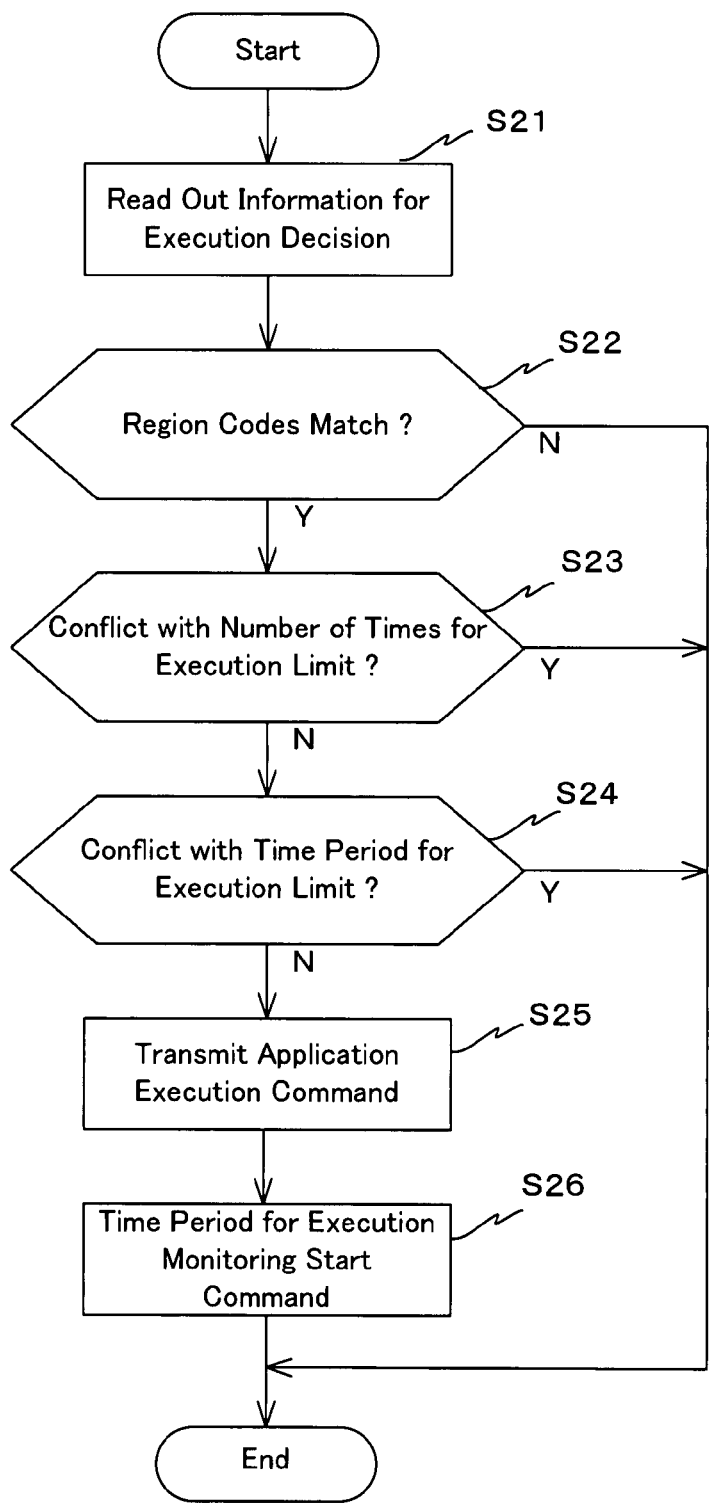
FIG. 13 is a flow chart for explanation of application execution processing by the cellular phone of FIG. 1.

In the application execution control unit 73, upon receipt of this notification, as shown in FIG. 13, in a step S21, the execution decision unit 91 of the application execution command unit 83 reads out, based upon the application identifier which has been notified, the terminal region code TRC and the application management information $61_j$ and the execution information $63_j$ of the engine application $39_j$ from the non-volatile region 37 or the recording medium PRM, as information for execution decision. Next, in steps S22 through S24, the same decision is performed as in the steps S12 through S14 described above, and a decision is made as to whether or not to permit the execution of the engine application $39_j$ (more precisely, of the application main body $62_j$). If the result of this decision is that execution is not permitted, then the execution decision unit 91 reports this fact to the overall control unit 79, with the reason appended. Upon receipt of this report, the overall control unit 79 conveys it to the user by displaying the contents which have been reported from the execution decision unit 91 upon the main display section 25M. And then the processing related to this application execution command terminates.

If, in the steps S22 through S24, it has been decided that execution of the engine application $39_j$ is permitted, then the execution decision unit 91, along with notifying the execution command transmission unit 92 to this effect, and along with notifying it of the application identifier of the engine application $39_j$, also notifies it of the cumulative number of times for execution up till now, of the time period for execution limitation information, and of the cumulative time period for execution at this time point. Upon receipt of this notification, in a step S25, the execution command transmission unit 92, along with sending the application execution command to the engine unit 40 with the application identifier set as a parameter, also stores the value, obtained by adding 1 to the cumulative number of times for execution which has been notified, into the non-volatile region 37 as the new cumulative number of times for execution information AET1. Next, in a step S26, the execution command transmission unit 92 sends a time period for execution monitor command to the time period for execution monitor unit 74, with the time period for execution limitation information and the cumulative time period for execution at this time point set as parameters. Upon receipt of this time period for execution monitor command, the time period for execution monitor unit 74 starts monitoring of the time period for execution. In this manner, the execution start processing of the application main body $62_j$ is completed.

On the other hand, in the engine unit 40 which has received the application execution command, the control processing unit 51, along with starting execution of the application main body $62_j$, also notifies an execution start report for the application main body $62_j$ to the host unit 30. When the operation of the application main body $62_j$ is started in this manner, the signal level of the engine output control signal ECT is set to a significant level by the engine unit 40. As a result, in the operational state of the application, the engine unit 40 comes to control the liquid crystal display element 25ML and the speaker 26M.

—The Operation of Controlling Stoppage of an Engine Application—

Next, the operation for controlling the stopping of an engine application will be explained.

When, during execution of the application main body $62_j$ by the engine unit 40, the user performs actuation input of an application stop command in which the identifier of the engine application $39_j$ is designated, the overall control unit 79 analyzes the actuation input data, and recognizes that this application stop command has been inputted. Next, the overall control unit 79 notifies the application execution control unit 73 to the effect that this application stop command has been inputted, and also notifies it of the application identifier.

In the application execution control unit 73, upon receipt of this notification, the application stop command unit 84 sends an application stop command to the engine unit 40, with the application identifier set as a parameter. Next, the application stop command unit 84 sends a stop command for the monitoring of the time period for execution to the time period for execution monitor unit 74, with said application identifier being set as a parameter. Upon receipt of this stop command for monitoring the time period for execution, the time period for execution monitor unit 74, along with stopping the monitoring of the time period for execution of the engine application $39_j$ which corresponds to said application identifier, also reports the cumulative time period for execution of the engine application $39_j$ up to this time point to the application stop command unit 84. And the application stop command unit 84 stores this cumulative time period for execution of the engine application $39_j$ of which a report has been received in the non-volatile region 37, as the new cumulative time period for execution information AET2.

On the other hand, in the engine unit 40, upon receipt of the application stop command, the control processing unit 51, along with stopping the execution of the application main body $62_j$, also notifies a stop report for the application main body $62_j$ to the host unit 30. When the stoppage processing of the application main body $62_j$ is performed in this manner, and the application main body which is being executed by the engine unit 40 ceases to be present, then the signal level of the engine output control signal ECT is set by the engine unit 40 to an insignificant level. As a result, in the application operational state, the host unit 30 comes to be in control of the liquid crystal display element 25ML and the speaker 26M.

—The Operation of Controlling Pause and Resume of an Engine Application—

Next, the operation for controlling pausing and resuming of an engine application will be explained.

When, during execution of the application main body $62_j$ by the engine unit 40, the user actuates the operation unit 21 and performs actuation input of an application pause command in which the identifier of the engine application $39_j$ is designated, then the overall control unit 79 analyzes this actuation input data, and recognizes that an application pause command has been inputted. Next, the overall control unit 79 notifies the application execution control unit 73 to the effect that this application pause command has been inputted, and of the application identifier. Furthermore when, during execution of the application main body $62_j$ by the engine unit 40, the arrival of a telephone call from the mobile communication network is detected, the overall control unit 79 notifies the application execution control unit 73 to the effect that it is necessary to pause the application, and of the application identifier.

In the application execution control unit 73, upon receipt of these notifications, the application stop command unit 84 sends an application pause command to the engine unit 40 with the application identifier which has thus been notified set as a parameter, in the same manner as in the case of the application stop command described above. Next, the application stop command unit 84 sends a pause command for monitoring of the time period for execution to the time period for execution monitor unit 74, with said application identifier being set as a parameter. Upon receipt of this stop command for the monitoring of the time period for execution, the time period for execution monitor unit 74 temporarily stops monitoring the time period for execution of the engine application $39_j$ which corresponds to said application identifier.

On the other hand, in the engine unit 40, upon receipt of the application pause command, the control processing unit 51, along with pausing the execution of the application main body $62_j$, also notifies a pause report for the application main body $62_j$ to the host unit 30. When stoppage processing for the application main body $62_j$ is performed in this manner, and when the application main body which is being executed by the engine unit 40 ceases to be present, the signal level of the engine output control signal ECT is set to an insignificant level by the engine unit 40, in the same manner as in the case of receipt of an application stop command as explained above. As a result, in the application operational state, the host unit 30 comes to be in control of the liquid crystal display element 25ML and the speaker 26M.

Furthermore when, during pausing of the application main body $62_j$ by the engine unit 40, the user actuates the operation unit 21 and performs actuation input of an actuation resume command in which the identifier of the engine application $39_j$ is designated, the overall control unit 79 analyzes this actuation input data, and recognizes that an application resume command has been inputted. Next, the overall control unit 79 notifies the application execution control unit 73 to the effect that this application resume command has been inputted, and of the application identifier.

In the application execution control unit 73, upon receipt of this notification, the execution decision unit 91 of the application execution command unit 84 directly notifies the execution command transmission unit 92 to the effect that a resume command is to be transmitted to the engine unit 40, and of the application identifier which has been notified. And the execution command transmission unit 92, along with sending an application execution command to the engine unit 40 with the application identifier set as a parameter, also send a time period for execution monitoring resume command to the time period for execution monitor unit 74 with the application identifier set as a parameter. Upon receipt of this time period for execution monitor resume command, the time period for execution monitor unit 74 resumes the monitoring of the time period for execution of the engine application $39_j$.

On the other hand, in the engine unit 40, upon receipt of the application resume command, the control processing unit 51, along with starting the application main body $62_j$, also notifies the host unit 30 of the resumption of the application main application main body $62_j$, the signal level of the engine output control signal ECT is set to a significant level by the engine unit 40. As a result, in the application operational state, the engine unit 40 comes to be in control of the liquid crystal display element 25ML and the speaker 26M.

—The Operation of Reproduction Management for an Engine Application—

Next, the reproduction for management of stop control of an engine application will be explained.

When, in the state in which the application main body $62_j$ is not being executed by the engine unit 40, the user actuates the operation unit 21 and performs actuation input of an application reproduction command in which the identifier of the engine application $39_j$ and a destination for reproduction are designated, then the overall control unit 79 analyzes this actuation input data, and recognizes the fact that an application reproduction command has been inputted. Next, the overall control unit 79 notifies the management unit for reproduction and the like 75 to the effect that this application reproduction command has been inputted, and of the application identifier.

In the management unit for reproduction and the like 75, upon receipt of this notification, the reproduction management unit 86 first reads out the reproduction possible/impossible information $DCI_j$ of the application management information $61_j$ from the non-volatile region 37 or the recording medium PRM, based upon the possible/impossible information $DCI_j$ of the application management information $61_j$ from the non-volatile region 37 or the recording medium PRM, based upon the application identifier which has been notified. Next, the reproduction management unit 86 decides whether or not reproduction of the application $39_j$ is permitted, based upon the reproduction possible/impossible information $DCI_j$. If this decision is affirmative, then the reproduction management unit 86 reads out the application $39_j$, and stores the application $39_j$ in the destination for reproduction which has been specified. And then it reports to the overall control unit 79 to the effect that the reproduction of the application $39_j$ has been completed. Upon receipt of this report, the overall control unit 79 displays the contents of said report upon the main display section 25M, thus informing the user of reproduction completion.

On the other hand, if the result of the above described decision is negative, then the reproduction management unit 86 reports to the overall control unit 79 the fact that it is not possible to perform reproduction, since reproduction of the application $39_j$ is not permitted. Upon receipt of this report, the overall control unit 79 displays the contents of said report upon the main display section 25M, thus informing the user of the fact that reproduction has not been possible.

The processing related to application reproduction terminates in this manner.

—The Operation of Transmission Management for an Engine Application—

Next, the operation for management of transmission of an engine application will be explained.

When, in the state in which the application main body $62_j$ is not being executed by the engine unit 40, the user actuates the operation unit 21 and performs actuation input of an application transmission command in which the identifier of the engine application $39_j$ and a destination are designated, then the overall control unit 79 analyzes this actuation input data, and recognizes the fact that an application transmission command has been inputted. Next, the overall control unit 79 notifies the management unit for reproduction and the like 75 to the effect that this application transmission command has been inputted, and of the application identifier and the destination.

In the management unit for reproduction and the like 75, upon receipt of this notification, the transmission management unit 87 first reads out the transmission possible/impossible information $TCI_j$ of the application management information $61_j$ from the non-volatile region 37 or the recording medium PRM, based upon the application identifier which has been notified. Next, the transmission management unit 87 decides whether or not transmission of the application $39_j$ is permitted, based upon the transmission possible/impossible information $TCI_j$. If this decision is affirmative, then the transmission management unit 87 reads out the application $39_j$, and transmits the application $39_j$ to the destination which has been specified, via the wireless communication unit 32. And then it reports to the overall control unit 79 to the effect that the transmission of the application $39_j$ has been completed. Upon receipt of this report, the overall control unit 79 displays the contents of said report upon the main display section 25M, thus informing the user of transmission completion.

On the other hand, if the result of the above described decision is negative, then the transmission management unit 87 reports to the overall control unit 79 the fact that it is not possible to perform transmission, since transmission of the application $39_j$ is not permitted. Upon receipt of this report, the overall control unit 79 displays the contents of said report upon the main display section 25M, thus informing the user of the fact that transmission has not been possible.

The processing related to application transmission terminates in this manner.

—The Operation of Modification Management for an Engine Application—

Next, the operation for managing the modification of an engine application will be explained.

When, in the state in which the application main body $62_j$ is not being executed by the engine unit 40, the user actuates the operation unit 21 to designate the identifier of the engine application $39_j$, and performs actuation input of an application modification command such as a command to adjust the color of the display image or the like, then the overall control unit 79 analyzes this actuation input data, and recognizes the fact that an application modification command has been inputted. Next, the overall control unit 79 notifies the management unit for reproduction and the like 75 to the effect that this application transmission command has been inputted, and of the application identifier and the destination.

In the management unit for reproduction and the like 75, upon receipt of this notification, the modification management unit 88 first reads out the modification possible/impossible information $MCI_j$ of the application management information $61_j$ from the non-volatile region 37 or the recording medium PRM, based upon the application identifier which has been notified. Next, the modification management unit 87 decides whether or not modification of the application $39_j$ is permitted, based upon the modification possible/impossible information $MCI_j$. If this decision is affirmative, then the modification management unit 88 reads out the application $39_j$, and performs the modification which has been specified. And then the modification management unit 88 takes this modified version as the new application $39_j$, and stores it in the non-volatile region 37.

On the other hand, if the result of the above described decision is negative, then the modification management unit 88 reports to the overall control unit 79 the fact that it is not possible to perform modification, since modification of the application $39_j$ is not permitted. Upon receipt of this report, the overall control unit 79 displays the contents of said report upon the main display section 25M, thus informing the user of the fact that modification has not been possible.

The processing related to application modification terminates in this manner.

As explained above, with the cellular phone 10 of this embodiment, the application load unit 72 loads the application main body $62_j$ of the engine application which has been acquired into the engine unit 40. Subsequently, when an execution command for the application main body $62_j$ is issued by the user, the execution decision unit 91 in the application execution command unit 83 of the application execution control unit 73 refers to the application management information $61_j$, and decides whether or not it is possible to execute the application main body $62_j$. If the result of this decision is affirmative, then the execution command transmission unit 92 commands the engine unit 40 to execute the application main body $62_j$. Upon receipt of this execution command, the engine unit 40 executes the application main body $62_j$. Accordingly, the host unit 30 and the engine unit 40 are able to maintain mutual linkage and to perform processing related to the engine application $39_j$ in an appropriate manner, while apportioning this processing related to the engine application $39_j$ in a logical manner.

Furthermore, the cellular phone 10 of this embodiment comprises a recorded contents reading device which is connected to the host processor 31, and which reads out the engine application $39_j$ from the recording medium upon which the engine application $39_j$ is recorded. Due to this, along with being able to acquire the engine application $39_j$ by utilizing a communication circuit via the wireless communication unit 32, the cellular phone 10 is also able to acquire the desired engine application $39_j$ by the recording medium PRM upon which the engine application $39_j$ is recorded being installed in the read/write device 23.

Furthermore, with the cellular phone 10 of this embodiment, if information specifying a number of times for execution limit is included in the application management information $61_j$, then the execution decision unit 91 decides whether or not the cumulative number of times of execution, after acquisition of the engine application $39_j$, does not conflict with the number of times for execution limit. And it executes the application main body $62_j$ only if this decision result is affirmative. Due to this, it is only possible to make the execution of the application main body $62_j$ possible within the range of the number of times for execution limit of the engine application $39_j$.

Furthermore, with the cellular phone 10 of this embodiment, if information specifying a time period for execution limit is included in the application management information 61$_j$, then the execution decision unit 91 decides whether or not the cumulative time period of execution, after acquisition of the engine application 39$_j$, does not conflict with the time period for execution limit. And the execution command transmission unit 92 sends an execution command for the application main body 62$_j$ to the engine unit 40, only if this decision result is affirmative. Furthermore, in the host unit 30, during execution of the engine application 39$_j$ by the engine unit 40, the time period for execution monitor unit 74 totals up the cumulative time period for execution of the engine application 39$_j$ and monitors exceeding of the totaled result over said time period for execution limit; and, if it detects exceeding of the time period for execution limit, then the application stop command unit 84 sends an execution stop command for the application main body 62$_j$ to the engine unit. Due to this, it is only possible to make it possible to execute the application main body 62$_j$ within the range of the time period for execution limit of the engine application 39$_j$.

Furthermore, with the cellular phone 10 of this embodiment, if an application region code ARC$_j$ for limiting the regions in which it is made permissible to execute the application management information 61$_j$ is included, then the execution decision unit 91 makes a decision as to whether or not the terminal region code TRC which is imparted to the cellular phone 10 matches this application region code ARC$_j$. And the execution command transmission unit 92 sends an execution command for the application main body 62$_j$ to the engine unit 40, only if the result of this decision is affirmative. Due to this, the cellular phone 10 is able to execute the engine application 39$_j$, only if it has a terminal region code TRC which matches the application region code ARC$_j$.

Furthermore, with the cellular phone 10 of this embodiment, in response to a reproduction command from the user for the engine application 39$_j$, the reproduction management unit 86 refers to the reproduction possible/impossible information DCI$_j$ of the application management information 61$_j$, and makes a decision as to whether or not reproduction of the engine application 39$_j$ is possible. If the result of this decision is affirmative, then the engine application 39$_j$ is reproduced. Due to this, it is possible to prevent reproduction of an engine application 39$_j$ which is not permitted by the copyright holder.

Furthermore, with the cellular phone 10 of this embodiment, in response to a transmission command from the user for the engine application 39$_j$, the transmission management unit 87 refers to the transmission possible/impossible information TCI$_j$ of the application management information 61$_j$, and makes a decision as to whether or not transmission of the engine application 39$_j$ is possible. And, if the result of this decision is affirmative, then the engine application 39$_j$ is transmitted. Due to this, it is possible to manage transmission of a work in accordance with the intentions of the copyright holder as described in the application management information 61$_j$, and it is possible to prevent transmission of an engine application 39$_j$ which is not permitted by the copyright holder.

Furthermore, with the cellular phone 10 of this embodiment, in response to a modification command from the user for the engine application 39$_j$, the modification management unit 87 refers to the modification possible/impossible information TCI$_j$ of the application management information 61$_j$, and makes a decision as to whether or not modification of the engine application 39$_j$ is possible. And, if the result of this decision is affirmative, then the engine application 39$_j$ is modified. Due to this, it is possible to manage modification of a work in accordance with the intentions of the copyright holder as described in the application management information 61$_j$, and, it is possible to prevent modification of an engine application 39$_j$ which is not permitted by the author, holder as described in the application management information 61$_j$, and, it is possible to prevent modification of an engine application 39$_j$ which is not permitted by the author, in consideration of the right to maintain integrity of the author.

Furthermore, with the application load unit 72 of the cellular phone 10 of this embodiment, the loading decision unit 81, in response to a load command from the user for the application main body 62$_j$, refers to the application management information 61$_j$, and decides whether or not the application main body 62$_j$ should be loaded. And the load execution unit 82 loads the application main body portion 62$_j$ into the engine unit 40, only if the result of this decision is affirmative. Due to this, it is possible to omit any operation of loading an application into the engine unit which would be ineffective.

It should be understood that, while the host processor 31 may also be made as a single processor, it is also possible to provide a two-processor structure incorporating a processor for communication and a general application processor, and to arrange matters so that the control of the engine unit 40 in the embodiment described above is performed by the general application processor.

Furthermore although, in the embodiment described above, it was arranged to house the display output selection unit 53 and the audio output selection unit 54 within the engine processor 41, it would also be acceptable to provide a configuration in which at least one of these is housed exterior to the engine processor 41.

Furthermore although, in the embodiment described above, it was arranged for the host interface unit 52 to comprise a two-port RAM, some other structure would be possible, provided that it is one in which interfacing with the host unit 30 can be contemplated.

Furthermore although, in the embodiment described above, the cellular phone was taken as being one of a clamshell type, it would also be possible to apply the present invention to a cellular phone of the straight type, the revolving type, the slide type, or the like.

Furthermore although, in the embodiment described above, the present invention was applied to a cellular phone, of course it would also be possible to apply the present invention to some other type of communication terminal device.

As explained above, the coordinated operation method of the present invention may be applied to coordinated operation of a host unit comprising a host processor, which performs processing related to communication with the exterior, and an engine unit comprising an engine processor, which executes predetermined functions under the management of the host unit.

Furthermore, the present invention may be applied to a communication terminal device, which comprises a host unit which performs processing related to communication with the exterior, and an engine unit which executes predetermined functions under the management of the host unit.

What is claimed is:

1. A coordinated operation method, comprising:
(a) providing a cellular phone including two processors in an interior of the cellular phone, the processors further including
a host processor which performs processing related to communication with an exterior of the cellular phone, and
an engine processor which is dedicated to screen display processing and audio data output processing of a work and which executes the work under management of said host processor, wherein the processors operate in a coordinated manner;

(b) an acquisition process in which said host processor acquires a main body portion of said work and also acquires work management information related to a utilization limit, including an execution limit for said work;

(c) a work load process in which said host processor loads said main body portion of said work into said engine processor;

(d) a work execution decision process in which, in response to a work execution command from a user, said host processor refers to said work management information, and decides whether or not said work can be executed;

a work execution command transmission process in which, if the result of the decision in said work execution decision process is affirmative, said host processor sends an execution command for said work to said engine processor;

the engine processor outputting an engine display image signal (BID) as a display image signal (MID) if a signal level of a host output control signal (HCT) of the execution command is below a predetermined level, and a signal level of an engine output control signal (ECT) is above the predetermined level;

the host processor outputting the host display image signal (HID) as the display image signal (MID) if the signal level of the host output control signal (HCT) is below the predetermined level, and the signal level of the engine output control signal (ECT) is also below the predetermined level; and executing said work.

2. The coordinated operation method as described in claim 1, wherein the host processor, when initialized, sets the signal level of the host output control signal (HCT) to the predetermined level.

3. The coordinated operation method as described in claim 1, wherein, if the signal level of the host output control signal (HCT) of the execution command is at the predetermined level, and it is being specified by the host output control signal that the host display image signal (HID) should be selected, then, irrespective of the signal level of an engine output control signal (ECT), outputting the host display image signal as the display image signal; and wherein, if the signal level of the host output control signal is not at the predetermined level, then selecting one of the host display image signal and the engine display image signal (EID) as the display image signal according to the signal level of the engine output control signal.

4. The coordinated operation method as described in claim 1, characterized in that a decision is made in said work execution decision process, after acquisition of said work, if information of a number of times execution limit is included in said work management information, as to whether or not the cumulative number of times of execution of said work does not conflict with said number of times for execution limit.

5. The coordinated operation method as described in claim 1, characterized in that, along with a decision being made in said work execution decision process, after acquisition of said work, if information of a time period for execution limit is included in said work management information, as to whether or not the cumulative time period of execution of said work does not conflict with said time period for execution limit, there are further comprised, in parallel with executing said work:

a cumulative time period of execution monitoring process of said host processor totaling the cumulative time period of execution of said work, and monitoring the excess of said time period of execution limit over the totaled result;

a work forcible stoppage command process of said host processor sending a stop command to said engine processor if, during said cumulative time period of execution monitoring process, it has been detected that said totaled result has exceeded said time period for execution limit; and a work forcible stoppage process of said engine processor stopping the execution of said work upon receipt of said work stop command.

6. The coordinated operation method as described in claim 1, characterized in that, if a work region code for limiting the region in which execution permission is given is included in said work management information, then, in said work execution decision process, a decision is made as to whether or not a terminal region code which is imparted to said communication terminal device matches said work region code.

7. The coordinated operation method as described in claim 1, characterized by further comprising:

a work reproduction decision process of said host processor, in response to a reproduction command for said work from the user, referring to said work management information, and deciding whether or not said work can be reproduced; and a work reproduction process of said host processor reproducing said work, if the result of this decision in said work reproduction decision process is affirmative.

8. The coordinated operation method as described in claim 1, characterized by further comprising:

a work transmission decision process of said host processor, in response to a transmission command for said work from the user, referring to said work management information, and deciding whether or not said work can be transmitted; and a work transmission process of said host processor transmitting said work, if the result of this decision in said work transmission decision process is affirmative.

9. The coordinated operation method as described in claim 1, characterized by further comprising:

a work modification decision process of said host processor, in response to a modification command for the main body of said work from the user, referring to said work management information, and deciding whether or not the main body of said work can be modified; and a work modification process of said host processor modifying the main body of said work, if the result of this decision in said modification decision process is affirmative.

10. The coordinated operation method as described in claim 1, characterized in that said work load process comprises:

a work loading decision process of said host processor, in response to a load command for said work from the user, referring to said work management information, and deciding whether or not said work is to be loaded; and a work load execution process of said host processor loading the main body portion of said work to said engine processor, if the result of this decision in said work loading decision process is affirmative.

11. A cellular phone including two processors in an interior of the cellular phone, the two processors operating in a coordinated manner and comprising a host processor and an engine processor; the cellular phone comprising:

a host processor, comprising the host processor, which performs processing related to communication with an exterior of the cellular phone, and an engine processor dedicated to screen display processing and audio data output processing of a work, comprising the engine processor, which executes the work under the management of said host processor;

and wherein said host processor comprises:

an acquisition device which acquires a main body portion of said work, and also acquires work management information related to a utilization limit, including an execution limit for said work;

a work loader which loads said main body portion of said work into said engine processor;

a work execution decision device which, according to a work execution command from a user, refers to said work management information, and decides whether or not said work can be executed; and a work execution command transmission which, if the result of the decision by said work execution decision device is affirmative, sends an execution command for said work to said engine processor;

wherein the engine processor outputs an engine display image signal (EID) as a display image signal (MID) if a signal level of a host output control signal (HCT) of the execution command is below a predetermined level, and a signal level of an engine output control signal (ECT) is above the predetermined level; and wherein the engine host processor outputs the host display image signal (HID) as the display image signal (MID) if the signal level of the host output control signal (HCT) is below the predetermined level, and the signal level of the engine output control signal (ECT) is also below the predetermined level.

12. The communication terminal device as described in claim 11, wherein the host processor, when initialized, sets the signal level of the host output control signal (HCT) to the predetermined level.

13. The communication terminal device as described in claim 11, wherein, if the signal level of the host output control signal (HCT) of the execution command is at the predetermined level, and it is being specified by the host output control signal that the host display image signal (HID) should be selected, then, irrespective of the signal level of an engine output control signal (ECT), outputting the host display image signal as the display image signal; and wherein, if the signal level of the host output control signal is not at the predetermined level, then selecting one of the host display image signal and the engine display image signal (EID) as the display image signal according to the signal level of the engine output control signal.

14. The communication terminal device as described in claim 11, characterized in that, along with said work execution decision means deciding, after acquisition of said work, if information of a time period for execution limit is included in said work management information, as to whether or not the cumulative time period of execution of said work does not conflict with said time period for execution limit, said host processor further comprises:

a cumulative time period of execution monitoring means which, during the execution of said work, while totaling the cumulative time period of execution of said work, also monitors the excess of said time period for execution limit over the totaled result; and a work forcible stoppage command means of sending a stop command for the execution of said work to said engine processor, if it has been detected by said cumulative time period of execution monitoring means that said totaled result has exceeded said time period for execution limit.

15. The communication terminal device as described in claim 11, characterized in that, if a work region code for limiting the region in which execution permission for said work management information is given is included in said work management information, then said work execution decision means makes a decision as to whether or not a terminal region code which is imparted to said communication terminal device matches said work region code.

16. The communication terminal device as described in claim 11, characterized in that said host processor further comprises a work reproduction means which, in response to a reproduction command for said work from the user, refers to said work management information and makes a decision as to whether or not said work can be reproduced, and reproduces said work, if the result of this decision is affirmative.

17. The communication terminal device as described in claim 11, characterized in that said host processor further comprises a work transmission means which, in response to a transmission command for said work from the user, refers to said work management information and makes a decision as to whether or not said work can be transmitted, and transmits said work, if the result of this decision is affirmative.

18. The communication terminal device as described in claim 11, characterized in that said host processor further comprises a work modification means which, in response to a modification command for the main body of said work from the user, refers to said work management information and makes a decision as to whether or not the main body of said work can be modified, and modifies the main body of said work, if the result of this decision is affirmative.

19. The communication terminal device as described in claim 11, characterized in that said work load means comprises:

a work loading decision means which, in response to a load command for said work from the user, refers to said work management information, and decides whether or not said work is to be loaded; and a work load execution means which loads the main body portion of said work to said engine processor, if the result of this decision by said work loading decision means is affirmative.

20. The communication terminal device as described in claim 11, characterized in that said host processor further comprises a wireless communication radio, connected to said host processor, for performing wireless communication with a base station of a mobile communication network.

* * * * *